US008127291B2

(12) United States Patent
Pike et al.

(10) Patent No.: US 8,127,291 B2
(45) Date of Patent: Feb. 28, 2012

(54) VIRTUAL MACHINE MANAGER FOR MANAGING MULTIPLE VIRTUAL MACHINE CONFIGURATIONS IN THE SCALABLE ENTERPRISE

(75) Inventors: Jimmy D. Pike, Georgetown, TX (US); Drue Reeves, Round Rock, TX (US); Manoj Gujarathi, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 1152 days.

(21) Appl. No.: 11/934,096

(22) Filed: Nov. 2, 2007

(65) Prior Publication Data

US 2009/0119664 A1    May 7, 2009

(51) Int. Cl.
G06F 9/455 (2006.01)
(52) U.S. Cl. .......................................................... 718/1
(58) Field of Classification Search .......................... None
See application file for complete search history.

(56) References Cited

U.S. PATENT DOCUMENTS

| | | | | |
|---|---|---|---|---|
| 5,764,911 | A * | 6/1998 | Tezuka et al. | 709/223 |
| 7,779,091 | B2 * | 8/2010 | Wilkinson et al. | 709/220 |
| 7,853,958 | B2 * | 12/2010 | Mathew et al. | 719/318 |
| 2002/0046228 | A1 * | 4/2002 | Scheifler et al. | 709/1 |
| 2004/0128670 | A1 * | 7/2004 | Robinson et al. | 718/1 |
| 2005/0071840 | A1 * | 3/2005 | Neiger et al. | 718/1 |
| 2005/0108593 | A1 | 5/2005 | Purushothaman et al. | |
| 2006/0069761 | A1 | 3/2006 | Singh et al. | |
| 2006/0123415 | A1 | 6/2006 | Dandekar et al. | |
| 2006/0155912 | A1 | 7/2006 | Singh et al. | |
| 2006/0184935 | A1 | 8/2006 | Abels et al. | |
| 2006/0184936 | A1 | 8/2006 | Abels et al. | |
| 2006/0184937 | A1 | 8/2006 | Abels et al. | |
| 2006/0236380 | A1 | 10/2006 | Bransom et al. | |
| 2007/0006205 | A1 | 1/2007 | Kennedy et al. | |
| 2007/0079307 | A1 | 4/2007 | Dhawan et al. | |
| 2007/0204266 | A1 * | 8/2007 | Beaty et al. | 718/1 |

* cited by examiner

*Primary Examiner* — Emerson Puente
*Assistant Examiner* — Gregory Kessler
(74) *Attorney, Agent, or Firm* — Hamilton & Terrile, LLP; Stephen A. Terrile

(57) ABSTRACT

A system and method are disclosed for using directory services to manage resources in a virtual execution environment. A directory repository is populated with resource, administration, roles, policy, and service-level agreement (SLA) objects. A service request is received by a virtual machine manager (VMM) administrator, which determines its requirements. The directory repository is queried with a directory service to identify available resources to fulfill the service request. The service request is routed to the VMM of the virtual machine (VM) host comprising the available resources. If an active VM comprises the available resources, then its roles, policy, and SLA objects are retrieved from the directory repository. The objects are then used to respectively determine if the service request has sufficient authentication and authorizations, if the VM's configuration meets the service request's resource requirements, and if service-levels requirements can be maintained.

34 Claims, 17 Drawing Sheets

VIRTUAL MACHINE MANAGER FOR MANAGING MULTIPLE VIRTUAL MACHINE CONFIGURATIONS IN THE SCALABLE ENTERPRISE

BACKGROUND OF THE INVENTION

1. Field of the Invention

The present invention relates in general to the field of information-handling systems and more specifically, to the management of resources in a virtual execution environment.

2. Description of the Related Art

As the value and use of information continues to increase, individuals and businesses seek additional ways to process and store information. One option available to users is information-handling systems. An information-handling system generally processes, compiles, stores, and/or communicates information or data for business, personal, or other purposes thereby allowing users to take advantage of the value of the information. Because technology and information-handling needs and requirements vary between different users or applications, information-handling systems may also vary regarding what information is handled, how the information is handled, how much information is processed, stored, or communicated, and how quickly and efficiently the information may be processed, stored, or communicated. The variations in information-handling systems allow for information-handling systems to be general or configured for a specific user or specific use such as financial transaction processing, airline reservations, enterprise data storage, or global communications. In addition, information-handling systems may include a variety of hardware and software components that may be configured to process, store, and communicate information and may include one or more computer systems, data storage systems, and networking systems.

Today's enterprises face many challenges, including reducing the total cost of ownership (TCO) of their information-processing operations. One approach that has gained popularity in recent years is virtualization, which allows a single resource, such as a server, an operating system, an application, or storage device to appear to function as multiple logical resources. Conversely, virtualization can also make multiple physical resources, such as storage devices or servers, appear as a single logical resource.

Another approach, which is complementary to virtualization, has been the adoption of enterprise-wide directories. These directories are capable of providing a shared information infrastructure for locating, managing, administrating and organizing information about resources of all kinds. In this context, resources can include computing and network resources, operating systems, applications, and other objects, including users. Such directories are typically accessed through a directory service, which serves as an abstraction layer between users and the resources they share. A simple directory service generally known as a naming service maps the names of computing and other resources to their respective network addresses. Each resource is considered an object of the directory server. Information about a particular resource is stored as attributes of that object. More sophisticated directories are designed with namespaces as users, services, devices, etc. For example, the lightweight directory access protocol (LDAP) is an application protocol for querying and modifying directory services running over TCP/IP.

A primary enabler of virtualization is a virtual machine monitor (VMM), also commonly known as a hypervisor, which allows multiple operating systems to run on a host computer at the same time. A virtual machine (VM) is software that creates a virtualized environment between the underlying computer platform and the guest operating system, so that the end-user can operate software on an abstract machine. Multiple VMs may be supported by a single VM host server. Today, virtualization software vendors provide vendor-specific software and methods to manage VMM-controlled resources for a physical system. However, managing the execution of multiple VMs across multiple VM hosts, and the resources they comprise, becomes challenging as the size of the virtual execution environment grows. It would be advantageous to have a more sophisticated approach to managing information about of the existence, location, capabilities, availability and current state of VM resources, VM hosts, VMMs, and VMs themselves. The implementation of directory services within a virtual execution environment could provide this ability, yet no solution currently exists.

SUMMARY OF THE INVENTION

A method and system are disclosed for using directory services to manage resources in a virtual execution environment. In various embodiments, a directory repository is populated with resource objects representing VM resources available to be used in the execution of a VM. Also resident in the directory repository are administration objects that represent, and are used to manage, virtual machine (VM) hosts, VM managers (VMMs), and active VMs. The directory repository also comprises roles objects that represent, and are used to manage, the authentication and authorization rights of VM hosts, VMMs, and VMs. Also included are policy objects that represent, and are used to manage, the configuration of VM hosts, VMMs, and VMs. Likewise included are service-level agreement (SLA) objects that represent, and are used to manage, the service-levels the VM is required to maintain when executing a predetermined operation. In one embodiment, a service request is received by a VMM administrator, which uses a directory service to query the directory repository to identify VM hosts that comprise VM resources that are available to fulfill the service request. Once the available VM resources are identified, the VMM administrator routes the service request to the VMM of the identified VM host. In another embodiment, the service request is routed directly to the VMM. The VMM queries the directory repository with a directory service to determine if VM resources are available to fulfill the service request. Available VM resources are then compared to the requirements of the service request.

In one embodiment, the VM resources available to fulfill the service request are assigned to a currently executing VM. The VMM retrieves the roles object of the target VM and compares it to the requirements of the service request to determine if it has sufficient authentication and authorizations to proceed. If it does, the VMM retrieves the policy object of the target VM and compares it to the service request to determine if its requirements are met by the configuration of the target VM. If it does, the VMM retrieves the SLA object of the target VM and compares it to the service request to determine if its service-level requirements can be maintained by the configuration of the target VM. If so, then the service request is assigned to the target VM for fulfillment and the SLA object is monitored as the service request is fulfilled.

In another embodiment, the available VM resources are not assigned to a currently executing VM. Instead, they are available to be used to execute a new VM to fulfill the service request. The VMM creates a VM administration object for the management of the new VM. Once created, the VM administration object is stored in the directory repository and used by the VMM to manage the new VM. The available VM resources are then assigned to the new VM and their corresponding VM resource objects are updated in the directory repository. The VMM then creates a VM roles object for the new VM and configures its attributes to match the authentication and authorizations of the service request. Then the VMM creates a VM policy object and configures its attributes to match the VM configuration requirements of the service request. The VMM then creates a VM SLA object that is configured to define the service-level requirements to be maintained by the new VM. Once created and configured, the VM, roles, policy, and SLA objects are stored in the directory repository. The service request is then assigned to the new VM for fulfillment and the SLA object is monitored as the service request is fulfilled.

In one embodiment, the VM resources available to fulfill the service request are assigned to a currently executing VM. The VMM retrieves the roles object of the target VM and compares it to the requirements of the service request to determine if it has sufficient authentication and authorizations to proceed. If it does, the VMM retrieves the policy object of the target VM and compares it to the service request to determine if its requirements are met by the configuration of the target VM. If it does, the VMM retrieves the SLA object of the target VM and compares it to the service request to determine if its service level requirements can be maintained by the configuration of the target VM. If so, then the service request is assigned to the target VM for fulfillment and the SLA object is monitored as the service request is fulfilled.

In another embodiment, the available VM resources are not assigned to a currently executing VM. Instead, they are available to be used to execute a new VM to fulfill the service request. The VMM creates a VM administration object for the management of the new VM. Once created, the VM administration object is stored in the directory repository and used by the VMM to manage the new VM. The available VM resources are then assigned to the new VM and their corresponding VM resource objects are updated in the directory repository. The VMM then creates a VM roles object for the new VM and configures its attributes to match the authentication and authorizations of the service request. Then the VMM creates a VM policy object and configures its attributes to match the VM configuration requirements of the service request. The VMM then creates a VM SLA object that is configured to define the service level requirements to be maintained by the new VM. Once created and configured, the VM, roles, policy, and SLA objects are stored in the directory repository. The service request is then assigned to the new VM for fulfillment and the SLA object is monitored as the service request is fulfilled.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

The present invention provides a system and method for using directory services to manage resources in a virtual execution environment. For purposes of this disclosure, an information-handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information-handling system may be a personal computer, a network storage device, or any other suitable device and may vary in size, shape, performance, functionality, and price. The information-handling system may include random-access memory (RAM), one or more processing resources such as a central processing unit (CPU) or hardware or software control logic, ROM, and/or other types of nonvolatile memory. Additional components of the information-handling system may include one or more disk drives, one or more network ports for communicating with external devices as well as various input and output (I/O) devices, such as a keyboard, a mouse, and a video display. The information-handling system may also include one or more buses operable to transmit communications between the various hardware components.

Figure 1:
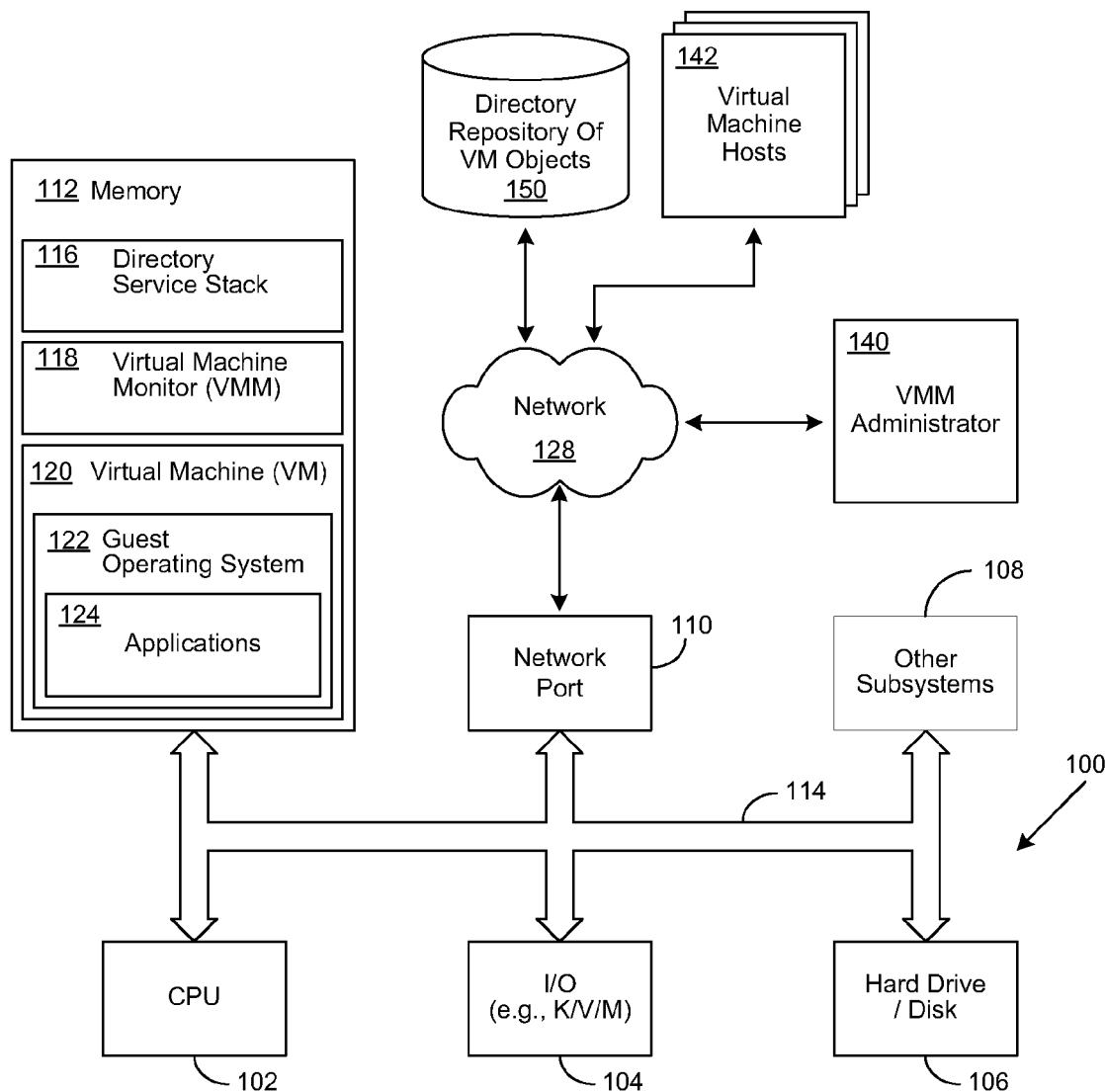
FIG. 1 is a general illustration of components of an information handling system as implemented in the system and method of the present invention.

FIG. 1 is a generalized illustration of an information-handling system 100 that can be used to implement the system and method of the present invention. The information-handling system includes a processor (e.g., central processor unit or "CPU") 102, input/output (I/O) devices 104, such as a display, a keyboard, a mouse, and associated controllers, a hard drive or disk storage 106, various other subsystems 108, network port 110 operable to connect to a network 128, and system memory 112, all interconnected via one or more buses 114. System memory 112 further comprises directory service stack 116, virtual machine monitor (VMM) 118, and virtual machine (VM) 120, further comprising guest operating system 122, and one or more applications 124. The directory service stack 116 is operable to provide network connectivity through network 128 for the VMM 118 to access the directory repository of VM objects 150. The VMM administrator 140 is able to connect through the network 128 to similarly access the directory repository of VM objects 150 for the management of the VMM 118 executing on information-handling system 100. The VMM administrator 140 is similarly able to connect through the network 128 to access the directory repository of VM objects 150 for the management of VMMs executing on one or more VM hosts 142.

Figure 2:
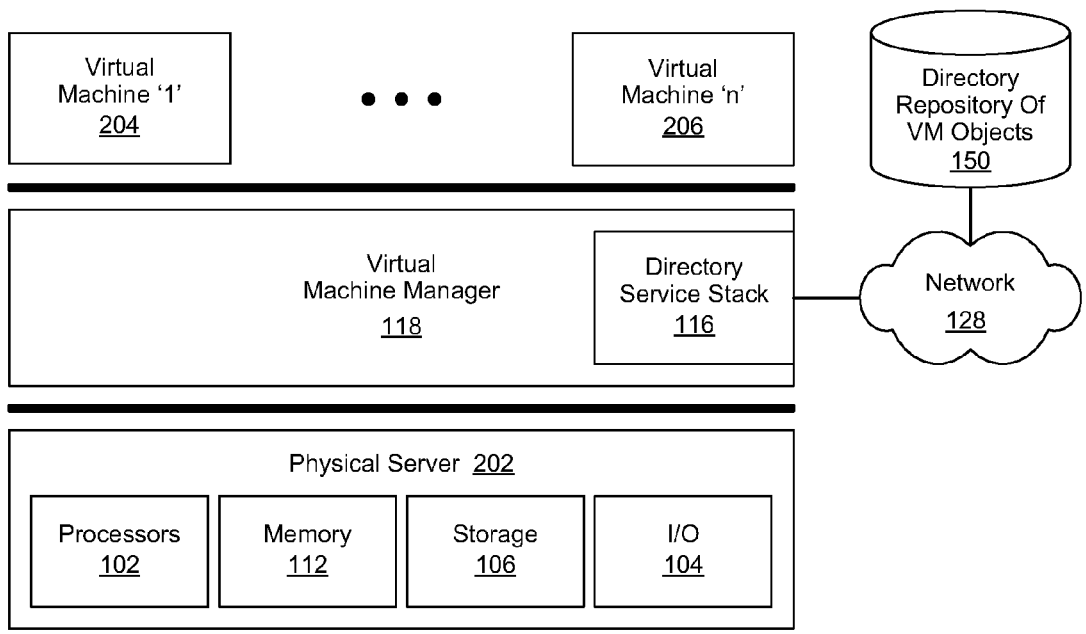
FIG. 2 is a simplified block diagram of a virtual machine manager (VMM) as used with a directory service to manage a plurality of virtual machines.

FIG. 2 is a simplified block diagram of a virtual machine manager (VMM) 118 as used with a directory service 116 in an embodiment of the invention to manage a plurality of virtual machines 204, 206. Physical server 202 comprises virtual machine (VM) resources including, but not limited to, one or more processors 102, memory 112, mass storage 106, such as disk and tape drives, and input/output (I/O) 104. A virtual machine manager (VMM) 118, also known to those of skill in the art as a virtual machine monitor and a hypervisor, is implemented on physical server 202 for the execution and management of VM '1' 204 through VM 'n' 206. The implementation of VMM 118 allows the physical VM resources 102, 112, 106, 104 to be abstracted, or virtualized. This resource virtualization results in the VM resources appearing as logical resources that can be dynamically assigned to VM '1' 204 through VM 'n' 206 by the VMM 118.

In this and other embodiments, the directory service stack 116 is implemented to provide the VMM 118 access to the directory repository of VM objects 150 through network 128. The directory repository of VM objects 150 comprises a plurality of objects that represent physical server 202, VM resources 102, 112, 106, 104, VMM 118, and VMs '1' 204 through 'n' 206. In various embodiments, each of the plurality of objects comprises a name and a plurality of attributes describing the resource it represents. In one embodiment, the objects are logically and hierarchically organized in a directory information tree (DIT). In another embodiment, the objects are accessed by the directory service stack 116 using the lightweight directory access protocol (LDAP).

Figure 3:
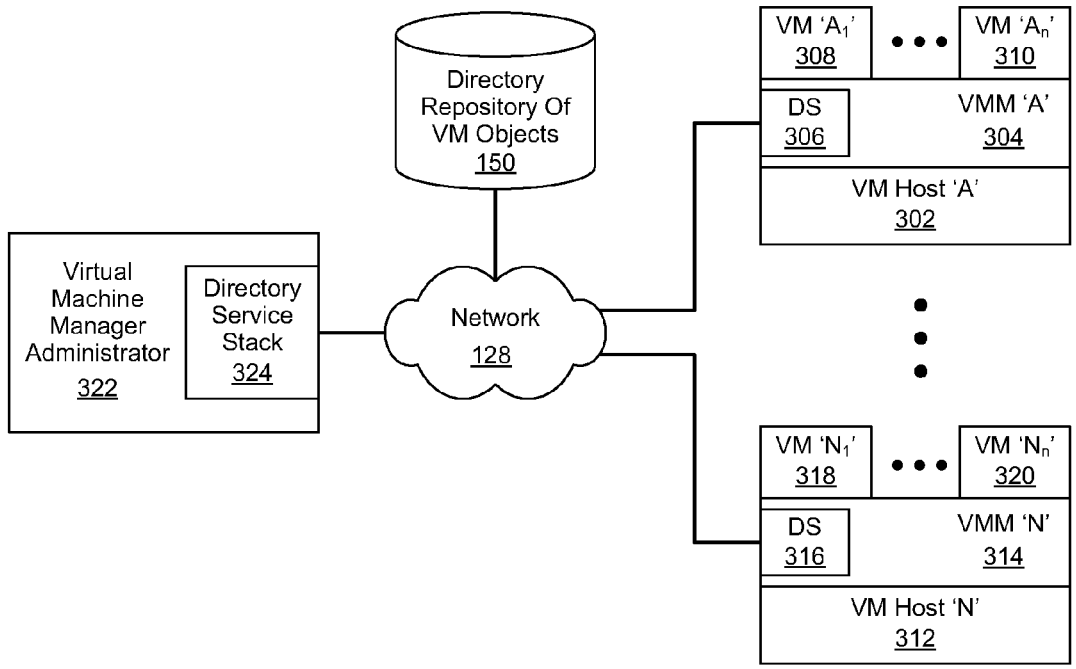
FIG. 3 is a simplified block diagram of a VMM as used with a directory service administrator to manage a plurality of virtual machines on a plurality of VM hosts.

FIG. 3 is a simplified block diagram of a virtual machine manager (VMM) administrator 322 as used with a directory service 324 to manage a plurality of virtual machines 308, 310, 318, 320 executing on a plurality of virtual machine (VM) hosts 302, 312. As described in greater detail herein, the VMM administrator 332 manages VMM 'A' 304 through VMM 'N' 314, respectively implemented on VM hosts 'A' 302 through 'N' 312. In turn, the VMM 'A' 304 respectively manages the execution of VM 'A$_1$' 308 through VM 'A$_n$' 310, and the VMM 'N' 314 respectively manages the execution of VM 'N$_1$' 318 through VM 'N$_n$' 320.

The VMM administrator 332 is implemented with a directory service stack 324 to provide access to the directory repository of VM objects 150 through network 128. Similarly, VMM 'A' 304 through VMM 'N' 314 are respectively implemented with directory service stacks 306 through 316 to likewise access the directory repository of VM objects 150 through network 128. As described in greater detail herein, the directory repository of VM objects 150 comprises a plurality of objects that represent VM Hosts 'A' 302 through 'N' 312 and the resources they respectively comprise. The directory repository of VM objects 150 likewise comprises a plurality of objects that represent VMM 'A' 304 through VMM 'N' 3 14, respectively implemented on VM Hosts 'A' 302 through 'N' 312. The directory repository of VM objects 150 also comprises a plurality of objects that represent VM 'A$_1$' 308 through VM 'A$_n$' 310, and VM 'N$_1$' 318 through VM 'N$_n$' 320, respectively executing on VM Hosts 'A' 302 through 'N' 312.

In various embodiments, the VMM administrator receives a service request. The VMM administrator 322 invokes the directory service stack 324 to query the directory repository of VM objects 150 to determine if VM resources are available to fulfill the service request. If there are, object information including their location and attributes is retrieved by the directory service stack 324 and submitted to the VMM administrator 322. The VMM administrator 322 performs comparison operations between the available VM resource objects and the requirements of the service request. The VMM administrator 322 then determines which of the VM Hosts 'A' 302 through 'N' 312 comprises the VM resources required to fulfill the service request. Using the retrieved VM resource object information, the service request is then routed by the VMM administrator to the selected VMM 'A' 304 through VMM 'N' 314, respectively implemented on VM Hosts 'A' 302 through 'N' 312 for fulfillment. The selected VMM 'A' 304 through VMM 'N' 314 receives the service request, and then determines which of the currently executing virtual machines will fulfill the request. Once the determination is made, the service request is assigned to the selected VM 'A$_1$' 308 through VM 'A$_n$' 310, and VM 'N$_1$' 318 through VM 'N$_n$' 320, respectively executing on VM Hosts 'A' 302 through 'N' 312.

Figure 4:
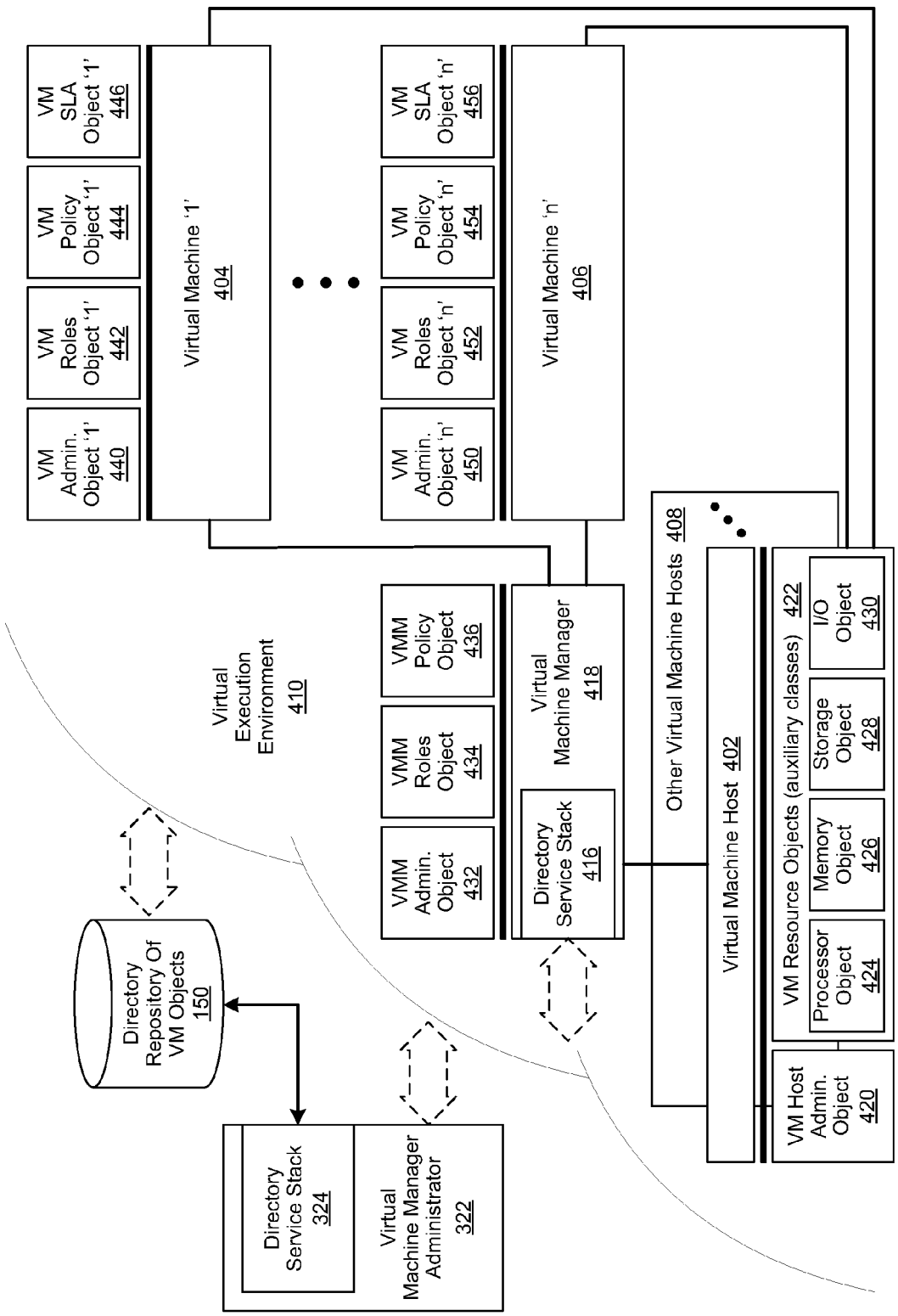
FIG. 4 is a simplified block diagram of a directory service as used with a VMM administrator to manage a plurality of VMMs on a plurality of VM hosts.
Figure 5A:
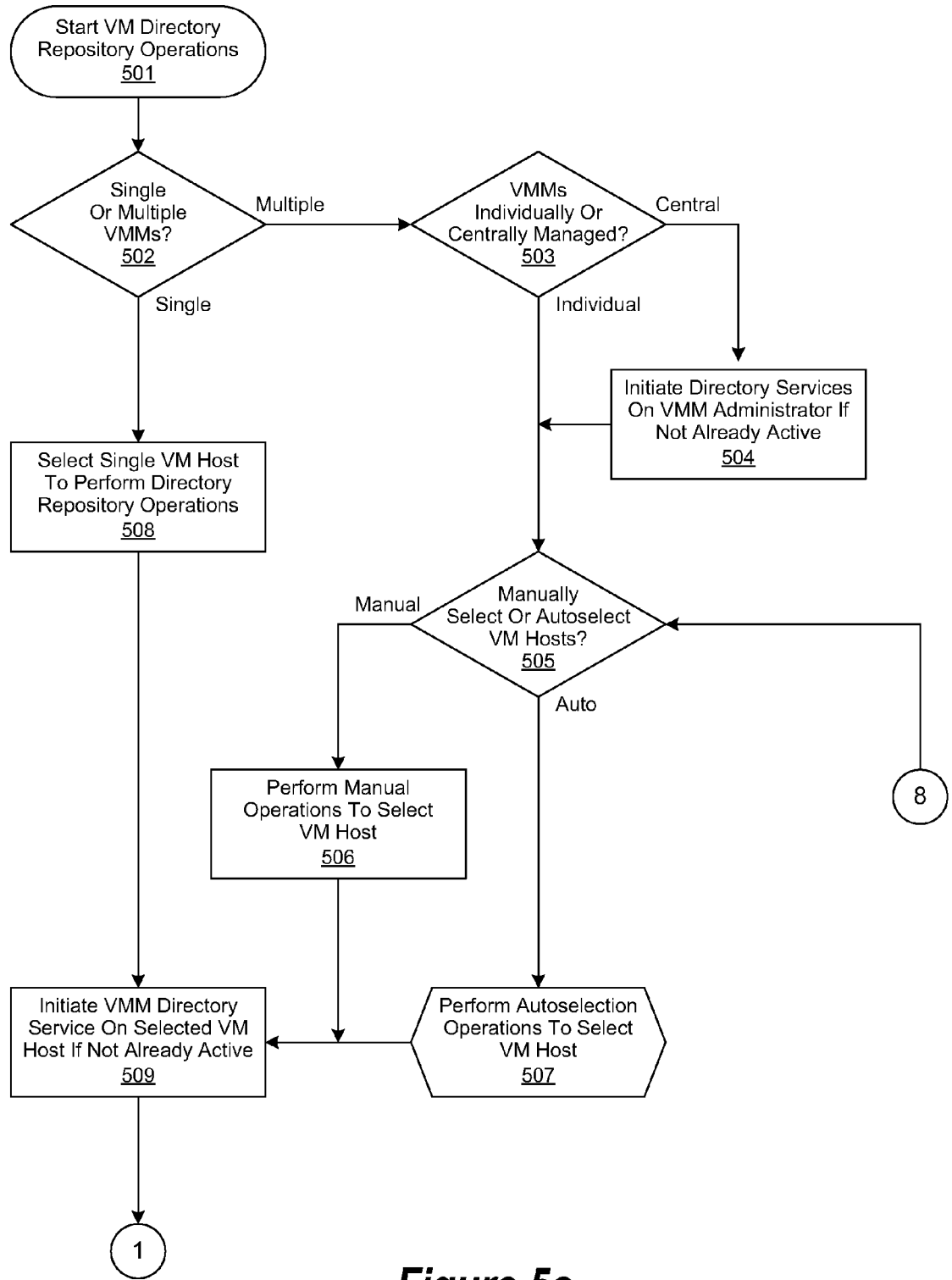
FIG. 5 is a simplified flowchart of a directory service as used to populate and update a directory repository with VM object information.
Figure 5B:
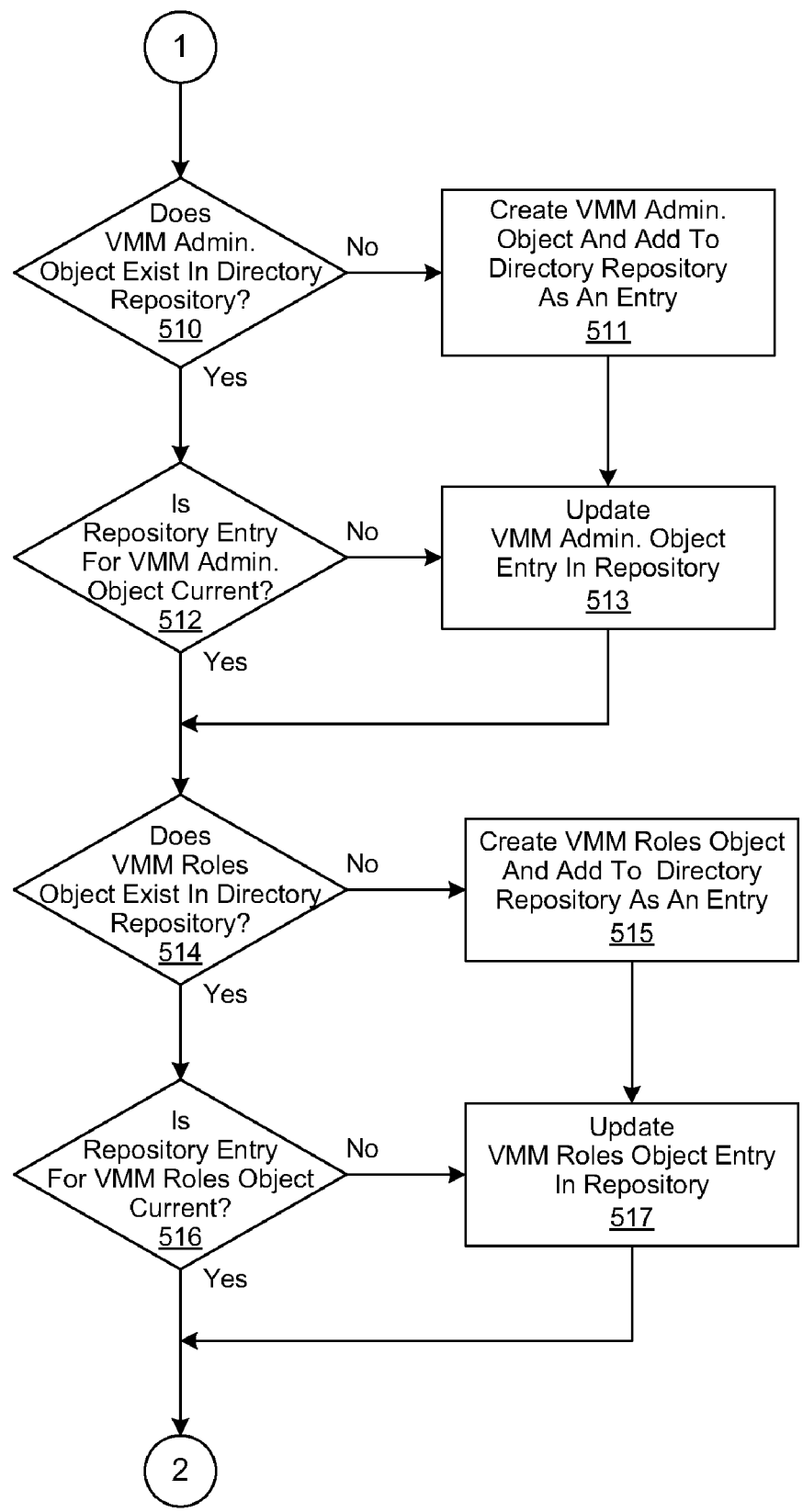
Figure 5C:
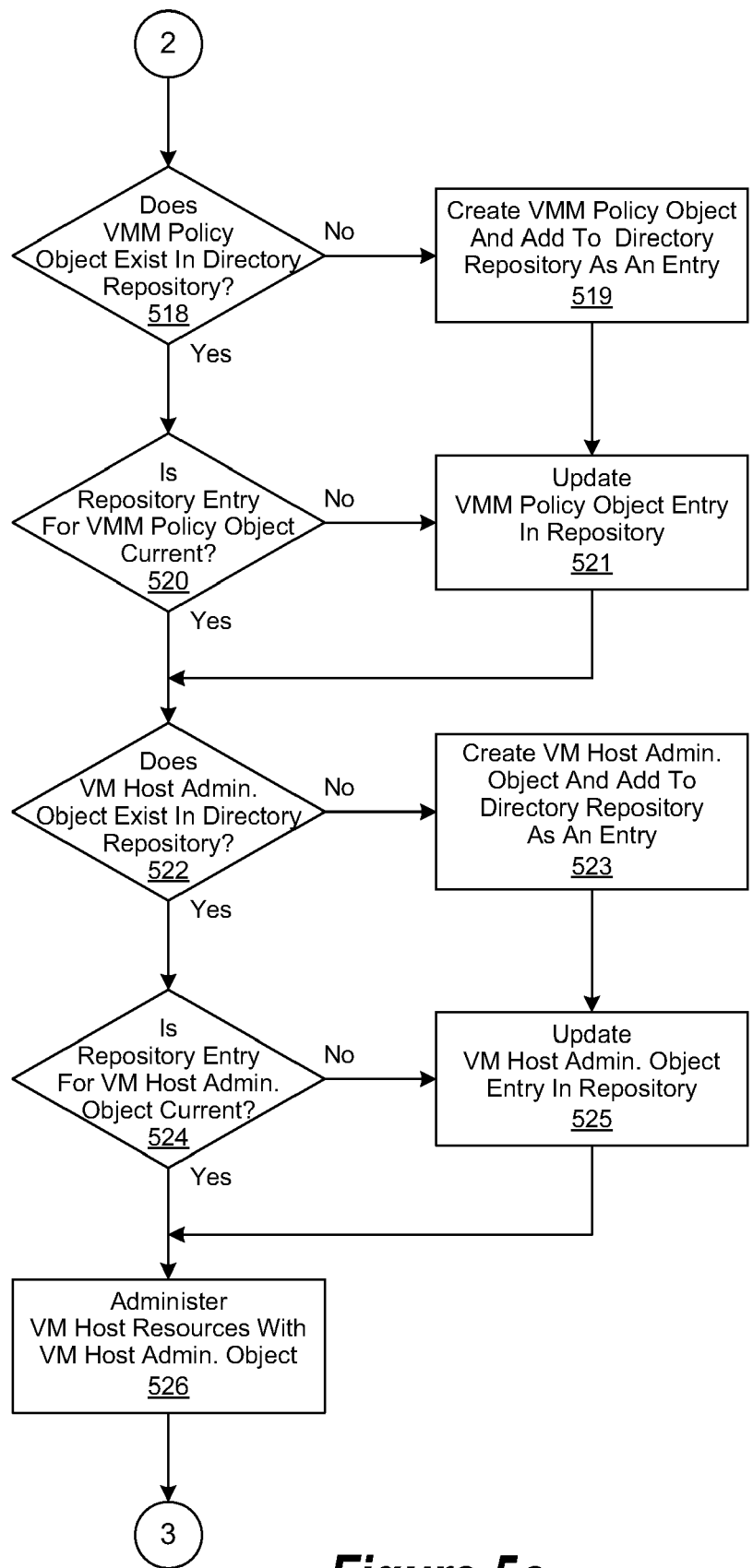
Figure 5D:
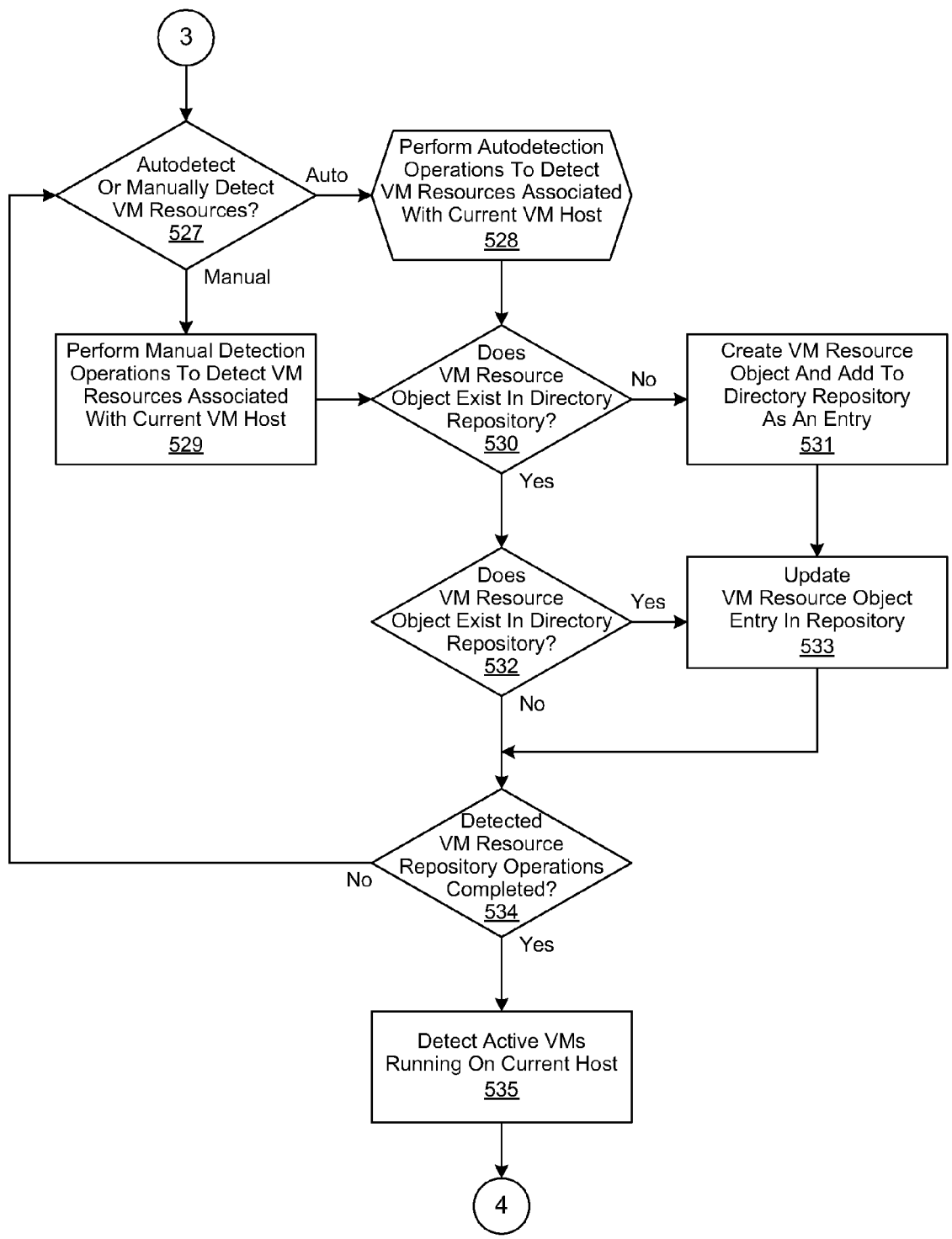
Figure 5E:
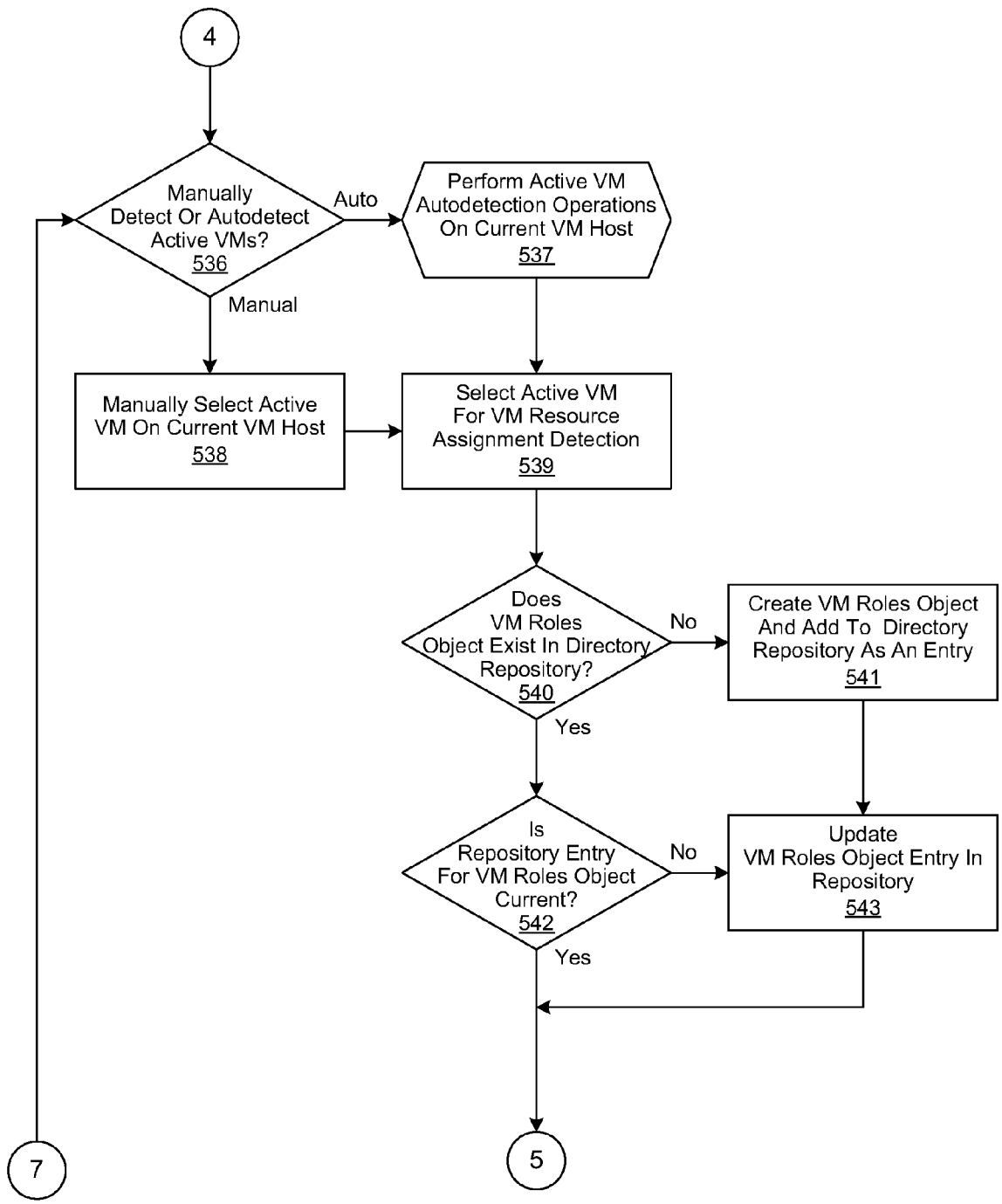
Figure 5F:
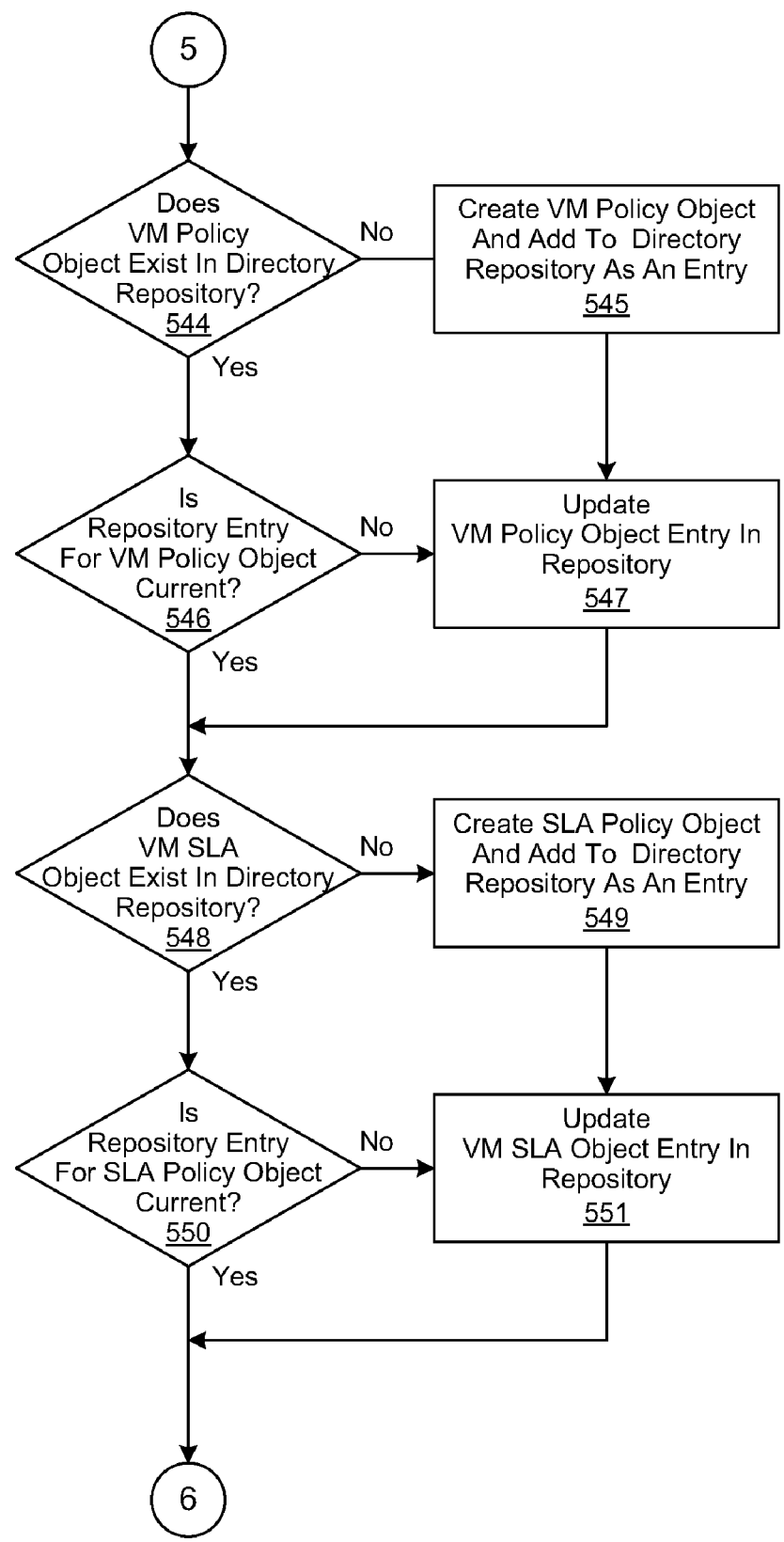
Figure 5G:
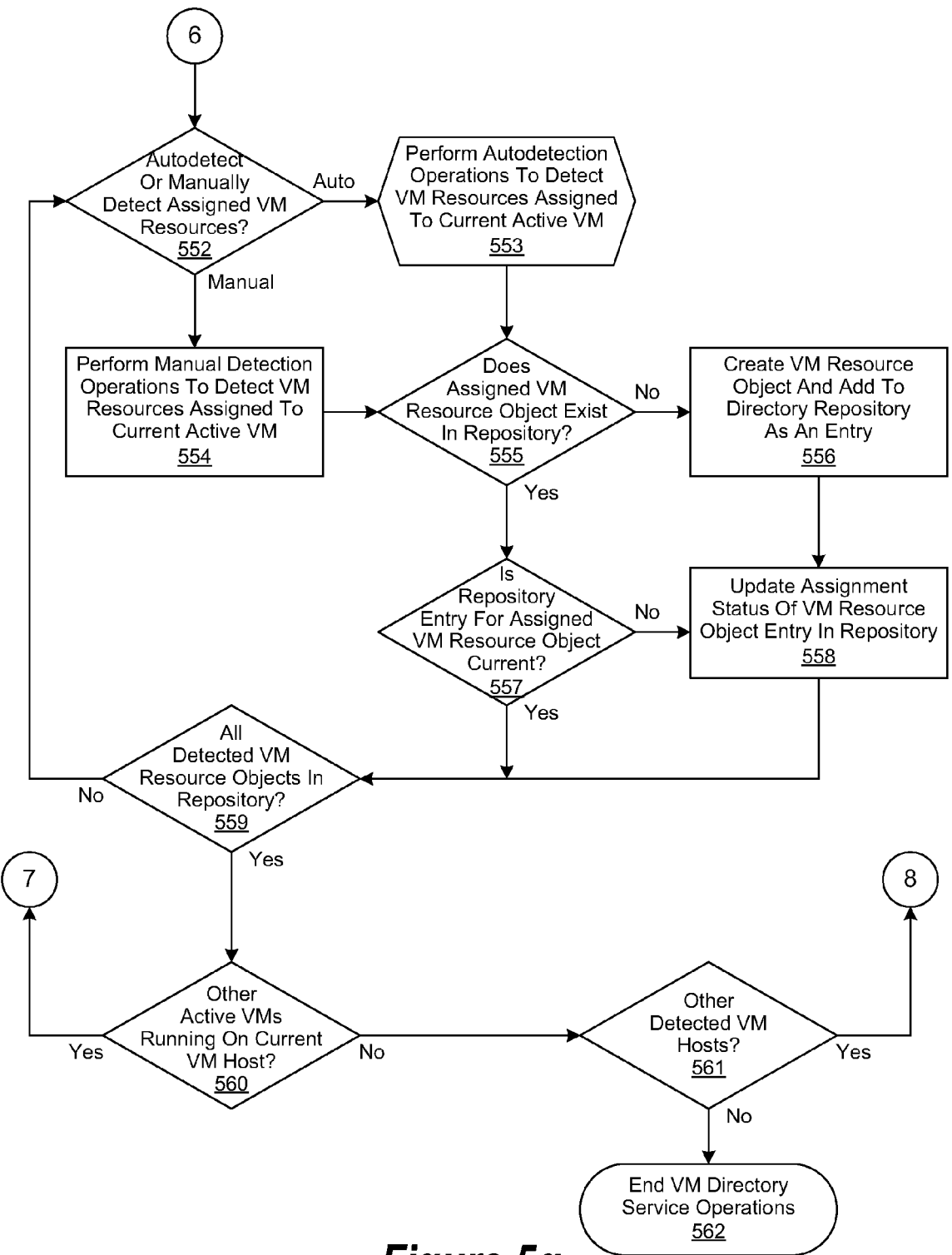
Figure 6A:
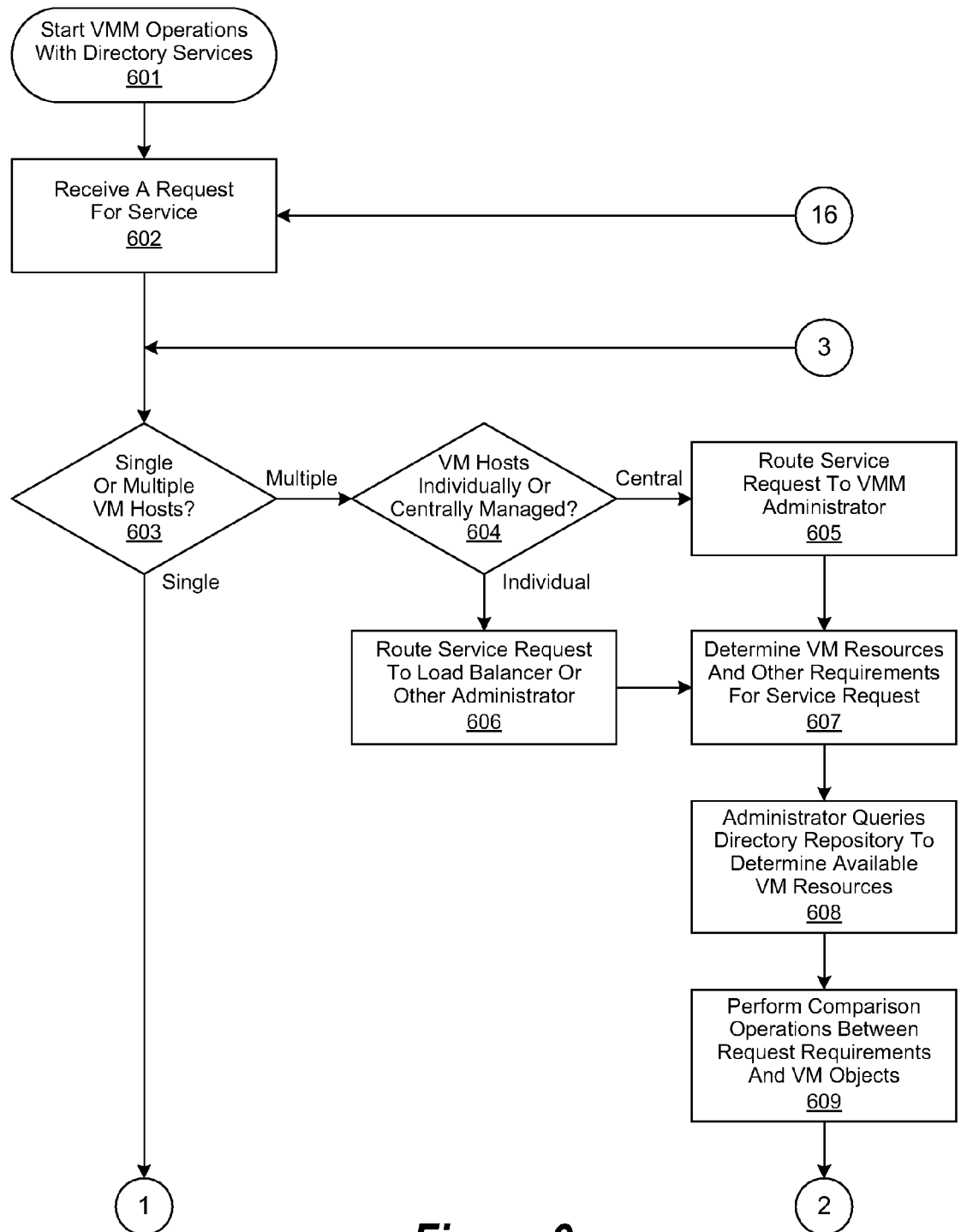
FIG. 6 is a flowchart of a directory service as used with a VMM to manage a plurality of virtual machines on a plurality of VM hosts.
Figure 6B:
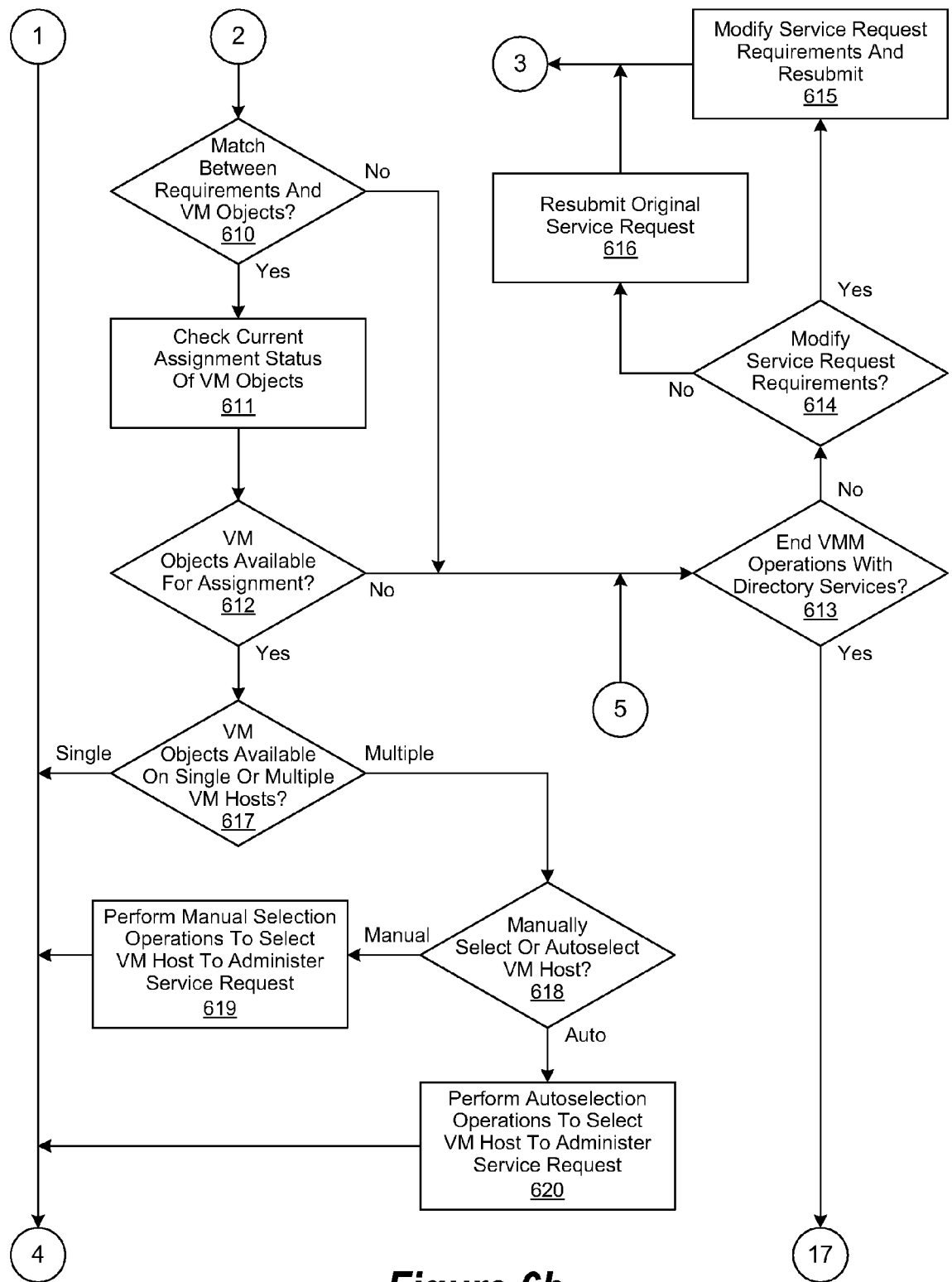
Figure 6C:
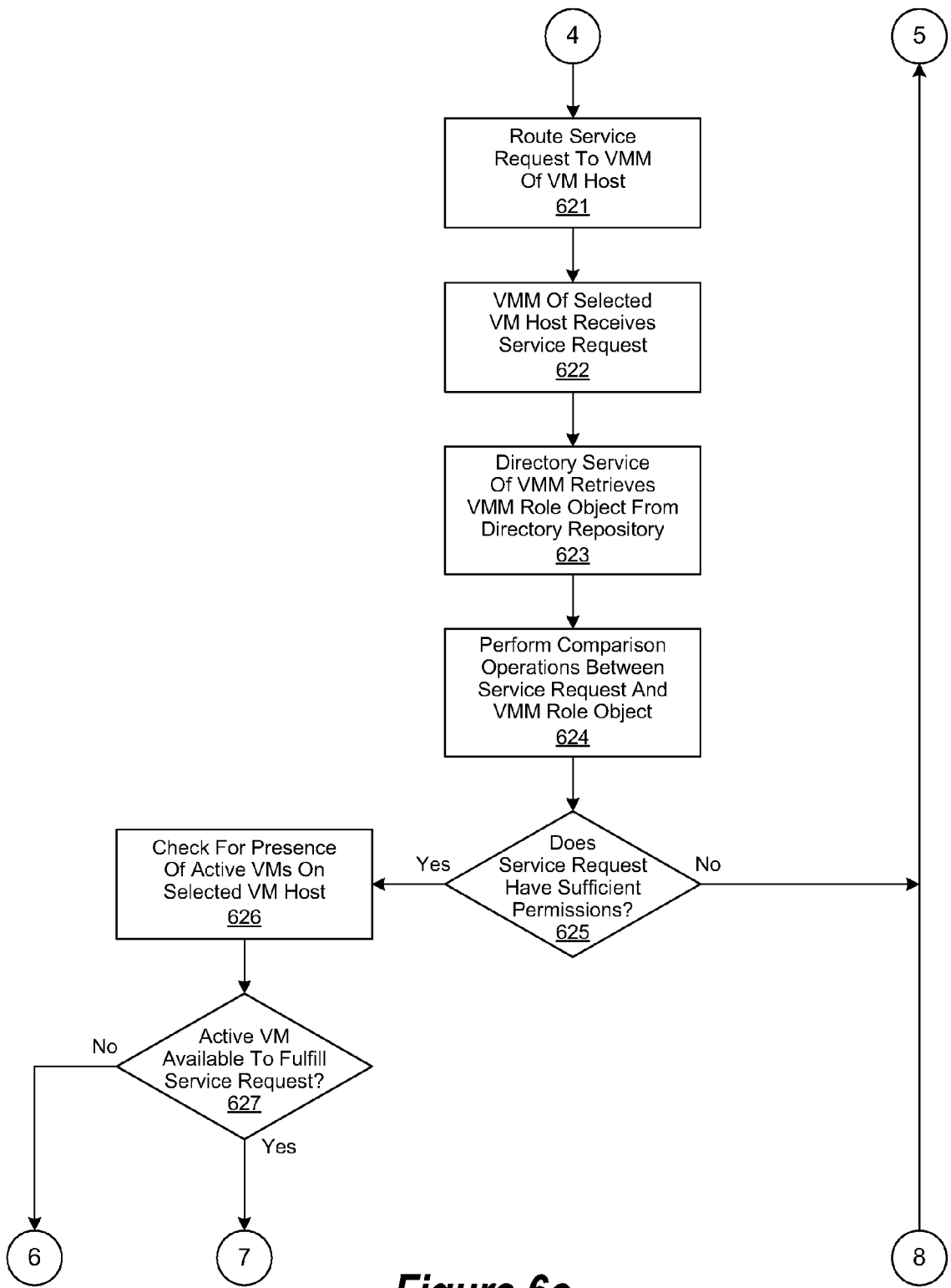
Figure 6D:
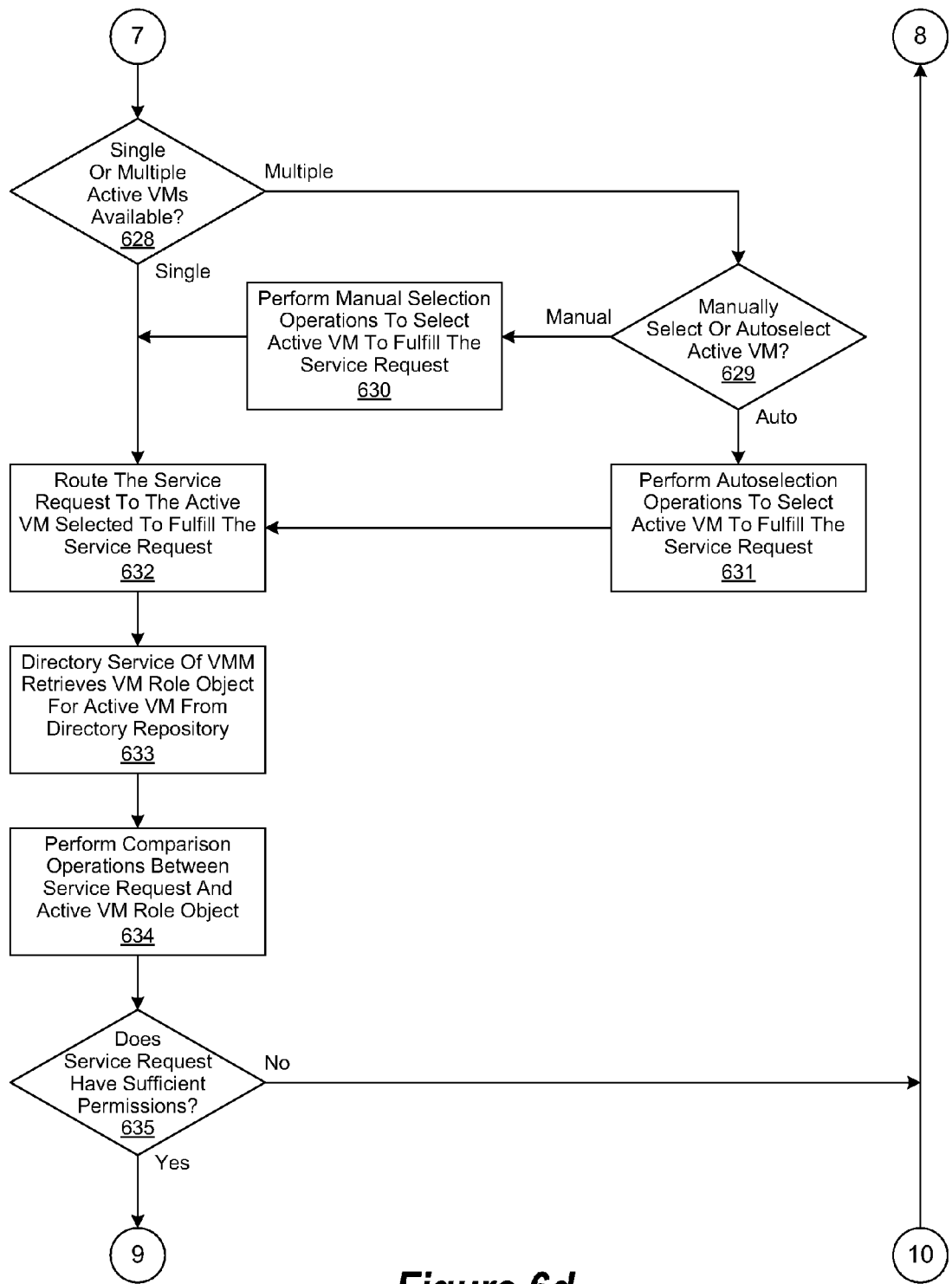
Figure 6E:
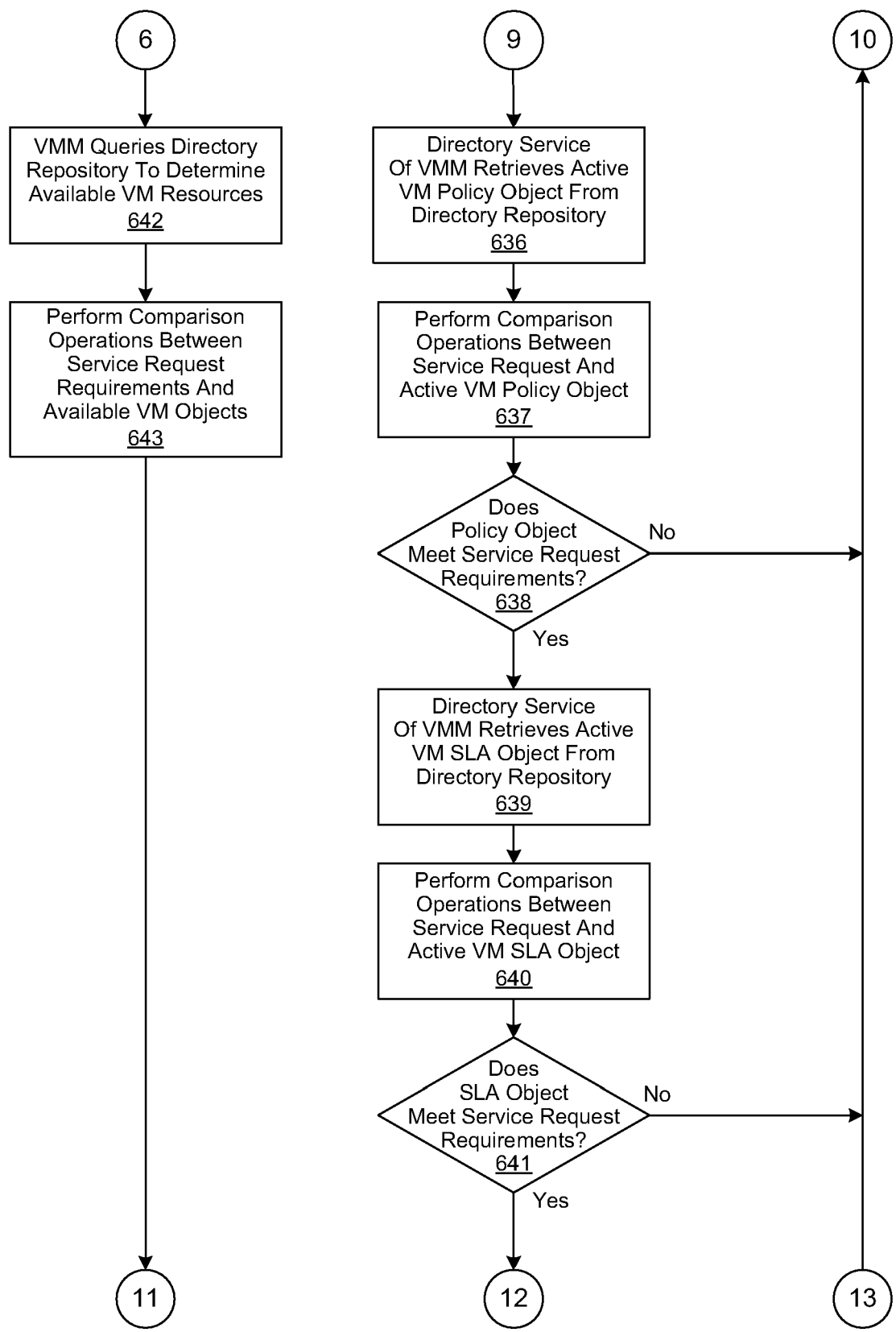
Figure 6F:
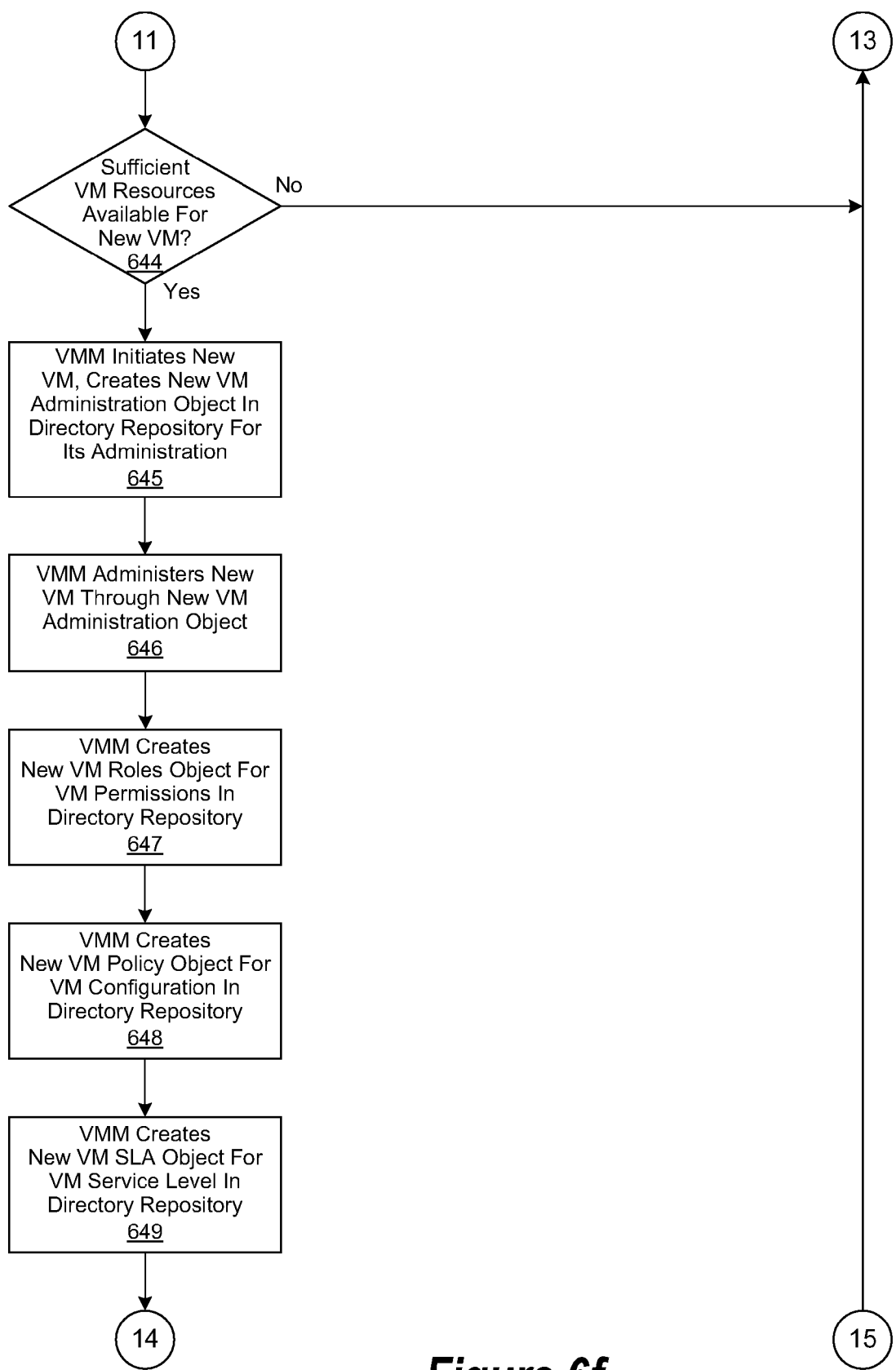
Figure 6G:
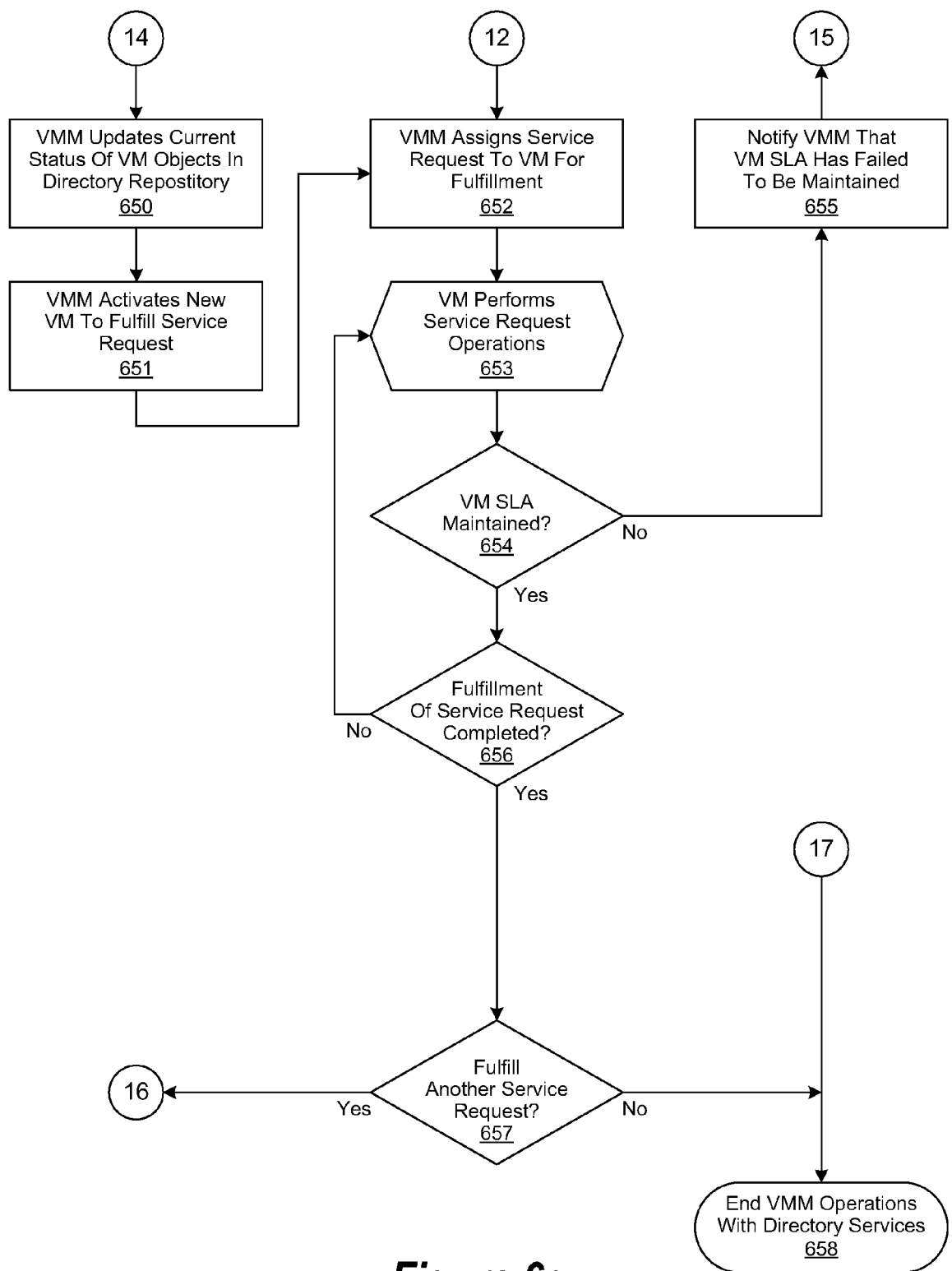

FIG. 4 is a simplified block diagram of a directory service 324 as used with a virtual machine manager (VMM) administrator 322 to manage a plurality of VMMs executing on a plurality of virtual machine (VM) hosts 402, 408. In various embodiments, the VMM 322, the directory repository of VM objects 150, the VM host 402, and other VM hosts 408 are implemented to perform operations in a virtual execution environment 410. The VM hosts 402, 408 are each represented by a VM host administration object 420, which is stored in the directory repository of VM objects 150 and is used for their management. The VM host 402 further comprises the VMM 418, which in turn comprises the directory service 416. The VMM 418 is represented by a VMM host administration object 432, also stored in the directory repository of VM objects 150, and it is similarly used by the VMM administrator 322 for its management.

In one embodiment, a request to perform a service is received by the VMM administrator 322, which is implemented with a directory service 324. The VMM administrator 322 then determines the VM resources and other requirements of the service request. The directory repository of VM objects 150 is then queried by the directory service 324 of the VMM administrator 322 to determine what VM resources are available to fulfill the service request. Comparison operations are then performed between the requirements of the service request and the available VM resources, which are represented by their corresponding VM resource objects 422 in the directory repository 150. In one embodiment, the VM resource objects 422 include, but are not limited to, processor object 424, memory object 426, storage object 428, and I/O object 430.

If there is a match between the requirements of the service request and the available VM resource objects 422, then a determination is made whether they are available for assignment to fulfill the service request. If it is determined that VM resources are available for assignment to fulfill the service request, then the service request is routed to VMM 418 of their associated VM host 402. The directory service 416 implemented on the VMM 418 then retrieves the VMM roles object 432 corresponding to the VMM 418 from the directory repository of VM objects 150. Comparison operations between the submitted service request and the retrieved VMM roles object 434 are performed by the VMM 418. Based on the comparison operations, a determination is then made whether the service request has sufficient authentication and authorization permissions to proceed. If it does, then the selected VM host 402 is checked for the presence of an active VM '1' 404 through VM 'n' 406 that is available to fulfill the service request. If it is determined that there are multiple active VMs 404, 406 on the VM host 402, then a determination is made whether the active VMs will be manually or automatically selected as described in greater detail herein.

The service request is routed to the selected active VM 402, 406. The directory service 416 implemented on the VMM 418 then retrieves the VM roles object 442, 452 corresponding to the selected VM '1' 404 through VM 'n' 406 from the directory repository of VM objects 150. Comparison operations between the submitted service request and the retrieved VM roles object 442, 452 are performed by the VMM 418. Based on the comparison operations, a determination is made whether the service request has sufficient authentication and authorization permissions to proceed. If it does, the directory service 416 implemented on the VMM 418 then retrieves the VM policy object 444, 454 corresponding to the active VM '1' 404 through VM 'n' 406 from the directory repository of VM objects 150. Comparison operations between the submitted service request and the retrieved VM policy object 444, 454 are performed by the VMM 418. Based on the comparison operations, a determination is then made whether the requirements of the service request are met by the configuration of the selected VM '1' 404 through VM 'n' 406. If they are, the directory service 416 implemented on the VMM 418 then retrieves the VM service-level agreement (SLA) object 446, 456 corresponding to the selected VM '1' 404 through VM 'n' 406 from the directory repository of VM objects 150. Comparison operations between the submitted service request and the retrieved VM SLA object 446, 456 are performed by the VMM 418. Based on the comparison operations, a determination is then made whether the service-level requirements of the service request can be maintained by the configuration of the selected VM '1' 404 through VM 'n' 406.

If not, or if an active VM '1' 404 through VM 'n' 406 is not available on the selected VM host 402 to fulfill the service request, then the VMM 418 uses the directory service 416 to query the directory repository of VM objects 150 and determine available VM resources objects 422. Comparison operations are then performed between the requirements of the service request and the VM objects in the directory repository 150 that are determined to be available. A determination is then made whether there are sufficient available VM objects 402 to execute a new VM '1' 404 through VM 'n' 406 on the selected VM host 402 to fulfill the requirements of the service request. If there are, the VMM 418 of the selected VM host 402 initiates a new VM '1' 404 through VM 'n' 406 and creates a corresponding new VM administration object 440, 450 for its administration in the directory repository of VM objects 150.

The newly initiated VM '1' 404 through VM 'n' 406 is then administered by the VMM 418 using its corresponding VM administration object 440, 450. The VMM 418 then creates a new VM roles object 442, 452 in the directory repository of VM objects 150 for the newly initiated VM '1' 404 through VM 'n' 406 corresponding to the authentication and authorization requirements of the service request. Then the VMM creates a new VM policy object 444, 454 in the directory repository of VM objects for the newly initiated VM '1' 404 through VM 'n' 406 corresponding to the VM configuration requirements of the service request. The VMM then creates a new VM SLA object 446, 456 in the directory repository of VM objects 150 for the newly initiated VM '1' 404 through VM 'n' 406 corresponding to the service level maintenance requirements of the service request. Then the VMM updates the current status of all VM objects 422, 440, 442, 444, 446, 450, 452, 454, 456 associated with the newly initiated VM '1' 404 through VM 'n' 406. Once the status of all the associated VM objects 422, 440, 442, 444, 446, 450, 452, 454, 456 have been updated in the directory repository of VM objects 150, the VMM 418 activates the newly initiated VM '1' 404 through VM 'n' 406 to receive the service request for fulfillment.

The VMM 418 then assigns the service request to the VM '1' 404 through VM 'n' 406 for fulfillment. Service request operations are then performed by the activated VM '1' 404 through VM 'n' 406 and the VM SLA object 446, 456 is used to monitor whether the service level requirements of the service request have been maintained. If they are not, the VMM 418 is notified that the conditions of the VM SLA object 446, 456 have failed to be maintained. VM operations continue until the fulfillment of the service request has been completed.

FIG. 5 is a simplified flowchart of a directory service as used to populate and update a directory repository with virtual machine object information. In this embodiment, virtual machine (VM) directory repository operations are started in step 501, followed by step 502, where a determination is made whether single or multiple VM managers (VMMs) are implemented. If it is determined in step 502 that multiple VMMs are implemented, then a determination is made in step 503 whether the VMMs are individually or centrally managed. If it is determined that they are centrally managed, then a VMM administrator implemented with a directory service is initiated in step 504. Once the VMM administrator is activated in step 504, or if it is determined in step 503 that the VMMs are individually managed, a determination is made in step 505 whether VM hosts will be manually or automatically selected. If it is determined in step 505 that VM hosts will be manually selected, then manual operations are performed in step 506 to detect the presence of VM hosts for selection. As an example, a human operator may know the location and presence of a VM host and be able to access it directly. However, if it is determined in step 505 that VM hosts will be automatically selected for VM directory repository operations, then autoselection operations are performed in step 507 to detect the presence of VM hosts for selection. For example, network addresses may be automatically scanned to detect the presence of a VM host. As another example, network and computing resource management databases may be queried to determine the network addresses and physical locations of VM hosts.

If it is determined in step 502 that there is only a single VM host, then the single VM host is selected for VM directory repository operations in step 508. After the single VM host is selected in step 508, or after VM host manual selection and autoselection operations are respectively completed in steps 506 and 507, then a directory service is initiated on the VMM of the selected VM host in step 509.

Once the directory service has been initiated on the VMM of the selected VM host in step 5 10, then a determination is made in step 510 whether a VMM administration object exists in the VM directory repository. If not, then a VMM administration object is created by the directory service and added as an entry to the VM directory repository in step 511.

In one embodiment, the VMM administration object represents the VMM in the directory repository. In another embodiment, the VMM administration object is accessed by a directory service to manage the VMM. If it is determined in step 510 that a VMM administration object exists in the VM directory repository, then a determination is made in step 512 whether the attribute and state information of the VMM administration object is current. If it is not, or if the VMM administration object has been created in step 511, then the attribute and state information of the VMM administration object is updated in step 513. If it is determined in step 512 that the attribute and state information of the VMM administration object is current, or if it has been updated in step 513, then a determination is made in step 514 whether a VMM roles object for the VMM exists in the VM directory repository. If not, then a VMM roles object is created by the directory service and added as an entry to the VM directory repository in step 515.

In one embodiment, the VMM roles object represents the authentication and authorization permissions of the VMM. In another embodiment, the VMM roles object is accessed by a directory service to manage the authentication and authorization permissions of the VMM. If it is determined in step 514 that a VMM roles object exists in the VM directory repository, then a determination is made in step 516 whether the attribute and state information of the VMM roles object is current. If it is not, or if the VMM roles object has been created in step 515, then the attribute and state information of the VMM roles object is updated in step 517.

If it is determined in step 516 that the attribute and state information of the VMM roles object is current, or if it has been updated in step 517, then a determination is made in step 518 whether a VMM policy object for the VMM exists in the VM directory repository. If not, then a VMM policy object is created by the directory service and added as an entry to the VM directory repository in step 519. In one embodiment, the VMM policy object represents the configuration of the VMM. In another embodiment, the VMM policy object is accessed by a directory service to manage the configuration of the VMM. If it is determined in step 518 that a VMM policy object exists in the VM directory repository, then a determination is made in step 520 whether the attribute and state information of the VMM policy object is current. If it is not, or if the VMM policy object has been created in step 519, then the attribute and state information of the VMM policy object is updated in step 521.

If it is determined in step 520 that the attribute and state information of the VMM policy object is current, or if it has been updated in step 517, then a determination is made in step 522 whether a VM host administration object for the selected VM host exists in the VM directory repository. If not, then a VM host administration object is created by the directory service and added as an entry to the VM directory repository in step 523. In one embodiment, the VM host administration object represents the selected VM host. In another embodiment, the VM host administration object is accessed by a directory service to manage the administration of the selected VM host. If it is determined in step 522 that a VM host administration object exists in the VM directory repository, then a determination is made in step 524 whether the attribute and state information of the VM host administration object is current. If it is not, or if the VM host administration object has been created in step 523, then the attribute and state information of the VM host administration object is updated in step 525.

In step 526, the VM host administration object is used by the directory service to perform VM directory repository operations on the VM resources associated with the selected VM host. In different embodiments, VM resources include but are not limited to, processors, memory, mass storage, input/output (I/O) interfaces, operating systems, and software applications. A determination is then made in step 527 whether the VM resources will be manually or automatically detected. If it is determined in step 527 that the VM resources will be detected automatically, then autodetection operations are performed in step 528. However, if it is determined in step 527 that the VM resources will be detected manually, then manual detection operations are performed in step 529.

Regardless of whether it is manually or automatically detected, a determination is then made in step 530 whether a VM resource object for the detected VM resource exists in the VM directory repository. If not, then a VM resource object is created by the directory service and added as an entry to the VM directory repository in step 531. In one embodiment, the VM resource object represents the detected VM resource. In another embodiment, the VM resource object is accessed by a directory service to manage the assignment of the VM resource to execute a predetermined VM. If it is determined in step 530 that a VM resource object exists in the VM directory repository, then a determination is made in step 524 whether the attribute and state information of the VM resource object is current. If it is not, or if the VM resource object has been created in step 531, then the attribute and state information of the VM resource object is updated in step 533.

A determination is then made in step 534 whether VM directory repository operations have been completed for all of the detected VM resources associated with the selected VM host. If not, then the process is repeated, beginning with step 527. Otherwise, active VMs that are currently executing on the selected VM host are detected, beginning with step 535. In step 536, a determination is made whether active VMs executing on the selected VM host will be manually or automatically detected. If it is determined in step 536 that the active VMs will be detected automatically, then autodetection operations are performed in step 537. However, if it is determined in step 536 that the active VMs will be detected manually, then manual detection operations are performed in step 538. Regardless of whether it is automatically detected in step 537 or manually detected in step 538, an active VM is selected in step 539 for the detection of assigned VM resources. A determination is then made in step 540 whether a VM roles object for the active VM exists in the VM directory repository. If not, then a VM roles object is created by the directory service for the active VM and added as an entry to the VM directory repository in step 541.

In one embodiment, the VM roles object represents the authentication and authorization permissions of the active VM. In another embodiment, the VM roles object is accessed by a directory service to manage the authentication and authorization permissions of the active VM. If it is determined in step 540 that a VM roles object for the active VM exists in the VM directory repository, then a determination is made in step 542 whether the attribute and state information of the VM roles object is current. If it is not, or if the VM roles object has been created in step 541, then the attribute and state information of the VM roles object is updated in step 543.

If it is determined in step 542 that the attribute and state information of the VMM roles object is current, or if it has been updated in step 543, then a determination is made in step 544 whether a VM policy object for the active VM exists in the VM directory repository. If not, then a VM policy object is created by the directory service and added as an entry to the VM directory repository in step 545. In one embodiment, the VM policy object represents the configuration of the active VM. In another embodiment, the VM policy object is accessed by a directory service to manage the configuration of the active VM. If it is determined in step 544 that a VM policy object for the active VM exists in the VM directory repository, then a determination is made in step 546 whether the attribute and state information of the VM policy object is current. If it is not, or if the VM policy object has been created in step 545, then the attribute and state information of the VM policy object is updated in step 547.

If it is determined in step 546 that the attribute and state information of the VMM roles object is current, or if it has been updated in step 547, then a determination is made in step 548 whether a VM service level agreement (SLA) object for the active VM exists in the VM directory repository. If not, then a VM SLA object is created by the directory service and added as an entry to the VM directory repository in step 549. In one embodiment, the VM SLA object represents the service levels the active VM is required to maintain when executing a predetermined operation. In another embodiment, the VM SLA object is accessed by a directory service to manage the mapping of VM resource objects to the required service levels of the active VM. If it is determined in step 548 that a VM SLA object for the active VM exists in the VM directory repository, then a determination is made in step 550 whether the attribute and state information of the VM SLA object is current. If it is not, or if the VM SLA object has been created in step 549, then the attribute and state information of the VM SLA object is updated in step 551.

A determination is then made in step 552 whether the VM resources assigned to the active VM will be manually or automatically detected. If it is determined in step 552 that the VM resources will be detected automatically, then autodetection operations are performed in step 553. However, if it is determined in step 552 that the VM resources assigned to the active VM will be detected manually, then manual detection operations are performed in step 554.

Regardless of whether it is manually or automatically detected, a determination is then made in step 555 whether a VM resource object for the detected VM resource assigned to the active VM exists in the VM directory repository. If not, then a VM resource object is created by the directory service and added as an entry to the VM directory repository in step 556. In one embodiment, the VM resource object represents the detected VM resource assigned to the active VM. In another embodiment, the VM resource object is accessed by a directory service to manage the assignment of the VM resource to execute a predetermined VM. If it is determined in step 555 that a VM resource object exists in the VM directory repository, then a determination is made in step 557 whether the attribute and state information of the VM resource object is current. If it is not, or if the VM resource object has been created in step 556, then the attribute and state information of the VM resource object is updated in step 558.

A determination is then made in step 559 whether VM directory repository operations have been completed for all of the detected VM resources assigned to the active VM. If not, then the process is repeated, beginning with step 552. Otherwise, a determination is made in step 560 whether other active VMs are currently executing on the selected VM host. If so, then the process is repeated, beginning with step 537. If not, then a determination is made in step 561 whether other VM hosts have been detected. If so, the process is repeated, beginning with step 505. If no other VM hosts have been detected, then VM directory repository operations are ended in step 562.

FIG. 6 is a flowchart of a directory service as used with a virtual machine manager (VMM) to manage a plurality of virtual machines on a plurality of VM hosts. In this embodiment, VMM operations in a virtual execution environment are started in step 601, followed by step 602 with the receipt of a request to perform a service. Upon receipt of the service request, a determination is made in step 603 whether single or multiple VM hosts are implemented within the directory services environment. If it is determined in step 603 that multiple VM hosts are implemented, then a determination is made in step 604 whether the VM hosts are individually or centrally managed. If it is determined that they are centrally managed, then the service request is routed to a VMM administrator implemented with a directory service in step 605. However, if it is determined in step 604 that the VM hosts are individually managed, then the service request is routed in step 606 to a load balancer or other system administrator familiar to those of skill in the art.

Once the VMM administrator receives the service request in step 605, or the service request is received by a load balancer or other system administrator in step 606, the VM resources and other requirements of the service request are determined in step 607. In step 608, the directory repository is queried by VMM administrator, load balancer, or other system administrator that has received the service request to determine what VM resources are available to fulfill the service request. Comparison operations are then performed in step 609 between the requirements of the service request and the directory repository VM objects representing available VM resources. A determination is then made in step 610 whether there is a match between the requirements of the service request and the VM resources represented by their corresponding VM objects in the directory repository. If there is, then the current assignment status of the VM resources, and other predetermined VM object attributes, are checked in step 611. A determination is then made in step 612 whether the VM resources are available for assignment to fulfill the service request.

If they are not, or if it is determined in step 610 that there is no match between the service request requirements and the VM objects in the directory repository, then a determination is made in step 613 whether to discontinue VMM operations in the virtual execution environment. If it is decided in step 613 to continue VMM operations, then a determination is made in step 614 whether the service request requirements are to be modified. If so, they are modified and the service request is resubmitted in step 615. If not, the original service request is resubmitted in step 616. Regardless of whether the service request is resubmitted with its modified requirements in step 615, or with its original requirements in step 616, the process is repeated, beginning with the receipt of the service request in step 602. However, if it is decided in step 613 to discontinue VMM operations in the virtual execution environment, then they are ended in step 658.

However, if it is determined in step 612 that VM resources are available for assignment to fulfill the service request, then a determination is made in step 617 whether the VM resources are available on single or multiple VM hosts. If it is determined in step 617 that the VM resources are on multiple VM hosts, then a determination is made in step 618 whether the VM hosts will be manually or automatically selected. If it is determined in step 618 that VM hosts will be manually selected, then manual operations are performed in step 619 to detect the presence of VM hosts for selection. As an example, a human operator may know the location and presence of a VM host and be able to access it directly. However, if it is determined in step 618 that VM hosts will be automatically selected, then autoselection operations are performed in step 620 to detect the presence of VM hosts. For example, a load balancer may automatically assign the service request to the VM host that is operating with the lightest load.

Regardless of whether it is determined that the VM objects are available on a single VM host in step 617, or whether the VM host is respectively selected manually or automatically in steps 619 and 620, the service request is routed to the selected VM host in step 621. The VMM of the selected VM host then receives the routed service request in step 622. The directory service implemented on the VMM then retrieves the VMM roles object corresponding to the VMM from the directory repository in step 623. Comparison operations between the submitted service request and the retrieved VMM roles object are performed by the VMM in step 624. Based on the comparison operations performed in step 624, a determination is then made in step 625 whether the service request has sufficient authentication and authorization permissions to proceed. If not, then the process is repeated, beginning with step 613, where a determination is made whether or not to continue VMM operations.

However, if it is determined in step 625 that the service request has sufficient authentication and authorization permissions to proceed, then the selected VM host is checked for the presence of active VMs. A determination is then made in step 627 whether an active VM is available on the selected host to fulfill the service request. If there is, then a determination is made in step 628 whether a single or multiple active VMs are available on the VM host. If it is determined in step 628 that there are multiple active VMs on the VM host, then a determination is made in step 629 whether the active VMs will be manually or automatically selected. If it is determined in step 629 that the active VMs will be manually selected, then manual operations are performed in step 630 to select the active VM. As an example, a human operator may want to select a predetermined active VM to fulfill the service request. However, if it is determined in step 629 that the active VM will be automatically selected, then autoselection operations are performed in step 631 to select the active VM to fulfill the service request. For example, the VMM may comprise a load balancer that automatically assigns the service request to the active VM that is operating with the lightest load.

Regardless of whether it is determined that there is a single active VM in step 617, or whether the active VM is respectively selected manually or automatically in steps 630 and 631, the service request is routed to the selected active VM in step 632. The directory service implemented on the VMM then retrieves the VM roles object corresponding to the active VM from the directory repository in step 633. Comparison operations between the submitted service request and the retrieved VM roles object are performed by the VMM in step 634. Based on the comparison operations performed in step 634, a determination is then made in step 635 whether the service request has sufficient authentication and authorization permissions to proceed. If not, then the process is repeated, beginning with step 613, where a determination is made whether or not to continue VMM operations.

The directory service implemented on the VMM then retrieves the VM policy object corresponding to the active VM from the directory repository in step 636. Comparison operations between the submitted service request and the retrieved VM policy object are performed by the VMM in step 637. Based on the comparison operations performed in step 637, a determination is then made in step 638 whether the requirements of the service request are met by the configuration of the VM. If not, then the process is repeated, beginning with step 613, where a determination is made whether or not to continue VMM operations.

Otherwise, the directory service implemented on the VMM then retrieves the VM service-level agreement (SLA) object corresponding to the active VM from the directory repository in step 639. Comparison operations between the submitted service request and the retrieved VM SLA object are performed by the VMM in step 640. Based on the comparison operations performed in step 640, a determination is then made in step 641 whether the service-level requirements of the service request can be maintained by the configuration of the VM. If not, then the process is repeated, beginning with step 613, where a determination is made whether or not to continue VMM operations.

However, if it is determined in step 627 that an active VM is not available on the selected VM host to fulfill the service request, then the VMM uses the directory service in step 642 to query the directory repository and determine available VM resources. Comparison operations are then performed in step 643 between the requirements of the service request and the VM objects in the directory repository that are determined to be available. A determination is then made in step 644 whether there are sufficient available VM objects to execute a new VM on the selected VM host to fulfill the requirements of the service request. If it is determined there are not, then the process is repeated, beginning with step 613, where a determination is made whether or not to continue VMM operations. Otherwise, the VMM of the selected VM host initiates a new VM in step 645 and creates a corresponding new VM administration object for its administration in the directory repository. The newly initiated VM is then administered in step 646 by the VMM using the VM's corresponding VM administration object. In step 647 the VMM creates a new VM roles object in the directory repository for the newly initiated VM corresponding to the authentication and authorization requirements of the service request. In step 648 the VMM creates a new VM policy object in the directory repository for the newly initiated VM corresponding to the VM configuration requirements of the service request. In step 649 the VMM creates a new VM SLA object in the directory repository for the newly initiated VM corresponding to the service level maintenance requirements of the service request. In step 650, the VMM then updates the current status of all VM objects associated with the newly initiated VM. Once the status of all the associated VM objects have been updated in the directory repository, the VMM activates the newly initiated VM to receive the service request for fulfillment.

The VMM then assigns the service request to the VM for fulfillment in step 652, regardless of whether it is newly activated in step 651 or whether it is a currently active VM that was determined in step 641 to have a corresponding VM SLA object that meets performance requirements of the service request. Service request operations are then performed by the designated VM in step 653. A determination is made in step 654 whether the service level requirements of the service request have been maintained. If not, the VMM is notified that the conditions of the VM SLA object have failed to be maintained. The process is then repeated beginning with step 613, where a determination is made whether or not to continue VMM operations. Otherwise a determination is made in step 656 whether fulfillment of the service request has been completed. If it has not, the process is repeated, beginning with step 653. Otherwise, a determination is made in step 657 whether another service request is to be fulfilled. If so, the process is repeated, beginning with step 602. Otherwise, VMM operations in a virtual execution environment are ended in step 657.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A system for managing virtual machines, comprising:
   a virtual machine (VM) host comprising a plurality of VM resources operable to execute a VM, the VM host executing on a computer system;
   a virtual machine manager (VMM) operable to perform a plurality of VM management operations to execute the VM;
   a directory repository comprising a plurality of objects, the plurality of objects respectively representing the VMM, the VM host, the plurality of VM resources, and the VM;
   a directory service operable to:
      perform object management operations on the plurality of objects contained in the directory repository; and
      provide object information to the VMM to perform the plurality of VM management operations; and,
   a VMM administrator operable to use the object information provided by the directory service to manage a plurality of VMMs.

2. The system of claim 1, wherein each of the plurality of objects comprises a name and a plurality of attributes.

3. The system of claim 1, wherein the plurality of objects is logically and hierarchically organized in a directory information tree (DIT).

4. The system of claim 1, wherein at least one of the plurality of objects comprises a VMM administration object representing the VMM, the VMM object operable to manage the VMM.

5. The system of claim 1, wherein the plurality of objects comprises a VMM roles object representing the authentication and authorization permissions of the VMM, the VMM roles object operable to be used to manage the authentication and authorization permissions of the VMM.

6. The system of claim 1, wherein the plurality of objects comprises a VMM policy object representing the configuration of the VMM, the VMM policy object operable to be used to manage the configuration of the VMM and further comprising VMM configuration policy.

7. The system of claim 1, wherein the plurality of objects comprises a VM administration object representing the VM, the VM object operable to be used to manage the VM.

8. The system of claim 1, wherein the plurality of objects comprises a VM roles object representing the authentication and authorization permissions of the VM, the VM roles object operable to be used to manage the authentication and authorization permissions of the VM.

9. The system of claim 1, wherein the plurality of objects comprises a VM policy object representing the configuration of the VM, the VM policy object operable to be used to manage the configuration of the VM and further comprising a VM configuration policy.

10. The system of claim 1, wherein the plurality of objects comprises a VM service-level agreement (SLA) object representing the service levels the VM is required to maintain when executing an operation, the VM SLA object operable to be used to manage the mapping of VM resources to the required service levels of the VM.

11. The system of claim 1, wherein the plurality of objects comprises a VM host administration object representing the VM host, the VM host object operable to be used to manage the VM host.

12. The system of claim 1, wherein the plurality of objects comprises a plurality of VM resource objects representing a plurality of VM resources operable to be used to execute the VM.

13. The system of claim 12, wherein the plurality of VM objects comprises object information describing the plurality of VM resources.

14. The system of claim 1, wherein the directory service uses the lightweight directory access protocol (LDAP) to access object information contained in the directory repository.

15. The system of claim 1, wherein the directory service is operable to determine object information of the plurality of objects contained in the directory repository.

16. The system of claim 1, wherein the directory service is operable to change object information of the plurality of objects contained in the directory repository as the configuration and state of the VM changes.

17. The system of claim 1, wherein the plurality of VM management operations comprises the VMM using object information provided by the directory service to map the plurality of VM resources to the VM.

18. A method for managing virtual machines, comprising:
   executing, on a computer system, a virtual machine (VM) on a VM host comprising a plurality of VM resources;
   performing a plurality of VM management operations with a virtual machine manager (VMM) to execute the VM;
   representing the VMM, the VM host, the plurality of VM resources, and the VM with a respective plurality of objects contained in directory repository;
   using a directory service operable to:
      perform object management operations on the plurality of objects contained in the directory repository; and
      provide object information to the VMM to perform the plurality of VM management operations; and,
   managing a plurality of VMMs via a VMM administrator, the VMM administrator using the object information provided by the directory service.

19. The method of claim 18, wherein each of the plurality of objects comprises a name and a plurality of attributes.

20. The method of claim 18, wherein the plurality of objects is logically and hierarchically organized in a directory information tree (DIT).

21. The method of claim 18, wherein the plurality of objects comprises a VMM administration object representing the VMM, the VMM object operable to manage the VMM.

22. The method of claim 18, wherein the plurality of objects comprises a VMM roles object representing the authentication and authorization permissions of the VMM, the VMM roles object operable to be used to manage the authentication and authorization permissions of the VMM.

23. The method of claim 18, wherein the plurality of objects comprises a VMM policy object representing the configuration of the VMM, the VMM policy object operable to be used to manage the configuration of the VMM and further comprising a VMM configuration policy.

24. The method of claim 18, wherein the plurality of objects comprises a VM administration object representing the VM, the VM object operable to manage the VM.

25. The method of claim 18, wherein the plurality of objects comprises a VM roles object representing the authentication and authorization permissions of the VM, the VM roles object operable to be used to manage the authentication and authorization permissions of the VM.

26. The method of claim 18, wherein the plurality of objects comprises a VM policy object representing the configuration of the VM, the VM policy object operable to be used to manage the configuration of the VM and further comprising a VM configuration policy.

27. The method of claim 18, wherein the plurality of objects comprises a VM service-level agreement (SLA) object representing the service levels the VM is required to maintain when executing an operation, the VM SLA object operable to be used to manage the mapping of VM resources to the required service levels of the VM.

28. The method of claim 18, wherein the plurality of objects comprises a VM host administration object representing the VM host, the VM host object operable to be used to manage the VM host.

29. The method of claim 18, wherein the plurality of objects comprises a plurality of VM resource objects representing a plurality of VM resources operable to be used to execute the VM.

30. The method of claim 29, wherein the plurality of VM objects comprises object information describing the plurality of VM resources.

31. The method of claim 18, wherein the directory service uses the lightweight directory access protocol (LDAP) to access object information contained in the directory repository.

32. The method of claim 18, wherein the directory service is operable to determine object information of the plurality of objects contained in the directory repository.

33. The method of claim 18, wherein the directory service is operable to modify object information of the plurality of objects contained in the directory repository as the configuration and state of the VM changes.

34. The method of claim 18, wherein the plurality of VM management operations comprises the VMM using object information provided by the directory service to map the plurality of VM resources to the VM.

\* \* \* \* \*